(12) United States Patent
Venkatachari et al.

(10) Patent No.: US 12,068,817 B2
(45) Date of Patent: Aug. 20, 2024

(54) MITIGATING RF CHAIN CONFLICT BETWEEN RADIO ACCESS TECHNOLOGIES IN WIRELESS COMMUNICATION

(71) Applicant: QUALCOMM Incorporated, San Diego, CA (US)

(72) Inventors: Harish Venkatachari, San Jose, CA (US); Biswajit Dutta, Bangalore (IN); Timothy Paul Pals, San Diego, CA (US); Gautham Jayaram, San Diego, CA (US); Sukhvinder Singh Arora, San Diego, CA (US); Chetan Khosla, Niwot, CO (US); Brian George, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 17/800,414

(22) PCT Filed: Feb. 25, 2021

(86) PCT No.: PCT/US2021/019544
§ 371 (c)(1),
(2) Date: Aug. 17, 2022

(87) PCT Pub. No.: WO2021/173760
PCT Pub. Date: Sep. 2, 2021

(65) Prior Publication Data
US 2023/0083089 A1    Mar. 16, 2023

(30) Foreign Application Priority Data
Feb. 25, 2020   (IN) .............................. 202041008030

(51) Int. Cl.
*H04B 7/06*      (2006.01)
*H04L 5/00*      (2006.01)
*H04W 76/15*     (2018.01)

(52) U.S. Cl.
CPC ......... *H04B 7/0602* (2013.01); *H04L 5/0048* (2013.01); *H04W 76/15* (2018.02)

(58) Field of Classification Search
CPC ..... H04B 7/0602; H04W 76/15; H04L 5/0048
See application file for complete search history.

(56) References Cited

U.S. PATENT DOCUMENTS 10,164,746 B2   12/2018   Fan et al.
10,333,670 B2    6/2019   Rico Alvarino et al.
(Continued)

FOREIGN PATENT DOCUMENTS

WO    2016191135    12/2016
WO    2017192232    11/2017

OTHER PUBLICATIONS

International Search Report and Written Opinion—PCT/US2021/019544—ISA/EPO—Oct. 27, 2021.

*Primary Examiner* — Janice N Tieu
(74) *Attorney, Agent, or Firm* — Loza & Loza, LLP

(57) ABSTRACT

A user equipment (UE) can connect to an evolved universal terrestrial radio access network (E-UTRAN) new radio (NR) dual-connectivity (EN-DC) network using both a Long Term Evolution (LTE) anchor link and a 5G NR non-anchor link. The UE shares RF chain components (e.g., antennas) between the LTE and NR links. The UE uses various techniques for controlling or modifying NR sounding reference signal (SRS) transmissions and/or LTE operations to avoid interruption on LTE operations due to NR SRS transmissions.

21 Claims, 20 Drawing Sheets

(56) References Cited

U.S. PATENT DOCUMENTS

| | | |
|---|---|---|
| 2018/0007707 A1 | 1/2018 | Rico Alvarino et al. |
| 2019/0052328 A1* | 2/2019 | Akula .................. H04L 5/001 |
| 2019/0215888 A1 | 7/2019 | Cirik et al. |
| 2019/0245649 A1 | 8/2019 | Siomina et al. |
| 2019/0261454 A1 | 8/2019 | Xiong et al. |

* cited by examiner

MITIGATING RF CHAIN CONFLICT BETWEEN RADIO ACCESS TECHNOLOGIES IN WIRELESS COMMUNICATION

CROSS-REFERENCE TO RELATED APPLICATION(S)

This application is the U.S. national stage of PCT patent application number PCT/US2021/019544 filed on Feb. 25, 2021. Application No. PCT/US2021/019544 claims priority to and the benefit of Indian patent application No. 202041008030 filed in the Indian Patent Office on Feb. 25, 2020, the entire contents of which are incorporated herein by reference as if fully set forth below in its entirety and for all applicable purposes.

TECHNICAL FIELD

The technology discussed below relates generally to wireless communication systems, and more particularly, to techniques for mitigating radio frequency (RF) chain conflicts between radio access technologies in antenna switching operations.

INTRODUCTION

New Radio (NR) is a fifth-generation (5G) wireless communication network defined in the 3rd Generation Partnership Project (3GPP) New Radio (NR) specifications. A 5G communication network may be implemented as a non-standalone (NSA) network that uses both a fourth-generation (4G) air interface (e.g., Long Term Evolution (LTE)) and an NR air interface. An exemplary NSA network may deploy Evolved-Universal Terrestrial Radio Access-New Radio (EN-DC) that may use an LTE anchor link for control functions (control plane) and an NR non-anchor link for user data (user plane). In some networks, an NSA network may support multiple radio access technologies (e.g., LTE and NR) using shared physical hardware, for example, radio antennas that can be switched between different LTE and NR radio chains.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the disclosure provides a method of wireless communication at an apparatus. The apparatus establishes a first connection and concurrently a second connection with a network using a plurality of antennas shared by the first connection using a first radio access technology (RAT) and the second connection using a second RAT. The apparatus configures a plurality of sounding reference signal (SRS) transmissions of the first connection based on a switching order of the plurality of antennas. The apparatus modifies communication of the second connection or the plurality of SRS transmissions to mitigate disruption of the communication of the second connection due to the switching order of the plurality of antennas.

One aspect of the disclosure provides a wireless communication device for wireless communication. The wireless communication device includes: a communication interface configured for wireless communication with a network, comprising a plurality of antennas; a memory; and a processor operatively coupled to the communication interface and the memory. The processor and the memory are configured to establish a first connection and concurrently a second connection with the network using the plurality of antennas shared by the first connection using a first radio access technology (RAT) and the second connection using a second RAT. The processor and the memory are configured to configure a plurality of sounding reference signal (SRS) transmissions of the first connection based on a switching order of the plurality of antennas. The processor and the memory are configured to modify communication of the second connection or the plurality of SRS transmissions to mitigate disruption of the communication of the second connection due to the switching order of the plurality of antennas.

One aspect of the disclosure provides a user equipment (UE) for wireless communication. The UE includes means for establishing a first connection and concurrently a second connection with a network using a plurality of antennas shared by the first connection using a first radio access technology (RAT) and the second connection using a second RAT. The UE further includes means for configuring a plurality of sounding reference signal (SRS) transmissions of the first connection based on a switching order of the plurality of antennas. The UE further includes means for modifying communication of the second connection or the plurality of SRS transmissions to mitigate disruption of the communication of the second connection due to the switching order of the plurality of antennas.

One aspect of the disclosure provides a computer-readable storage medium stored with code executable by a wireless communication device. The code includes instructions for establishing a first connection and concurrently a second connection with a network using a plurality of antennas shared by the first connection using a first radio access technology (RAT) and the second connection using a second RAT. The code further includes instructions for configuring a plurality of sounding reference signal (SRS) transmissions of the first connection based on a switching order of the plurality of antennas. The code further includes instructions for modifying communication of the second connection or the plurality of SRS transmissions to mitigate disruption of the communication of the second connection due to the switching order of the plurality of antennas.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain implementations and figures below, all examples can include one or more of the advantageous features discussed herein. In other words, while one or more embodiments may be discussed as having certain advantageous features, one or more of such features may also be used in accordance with the various examples discussed herein. In a similar fashion, while exemplary implementations may be discussed below as device, system, or method, it should be understood that such examples can be implemented in various devices, systems, and methods.

DETAILED DESCRIPTION

Figure 1:
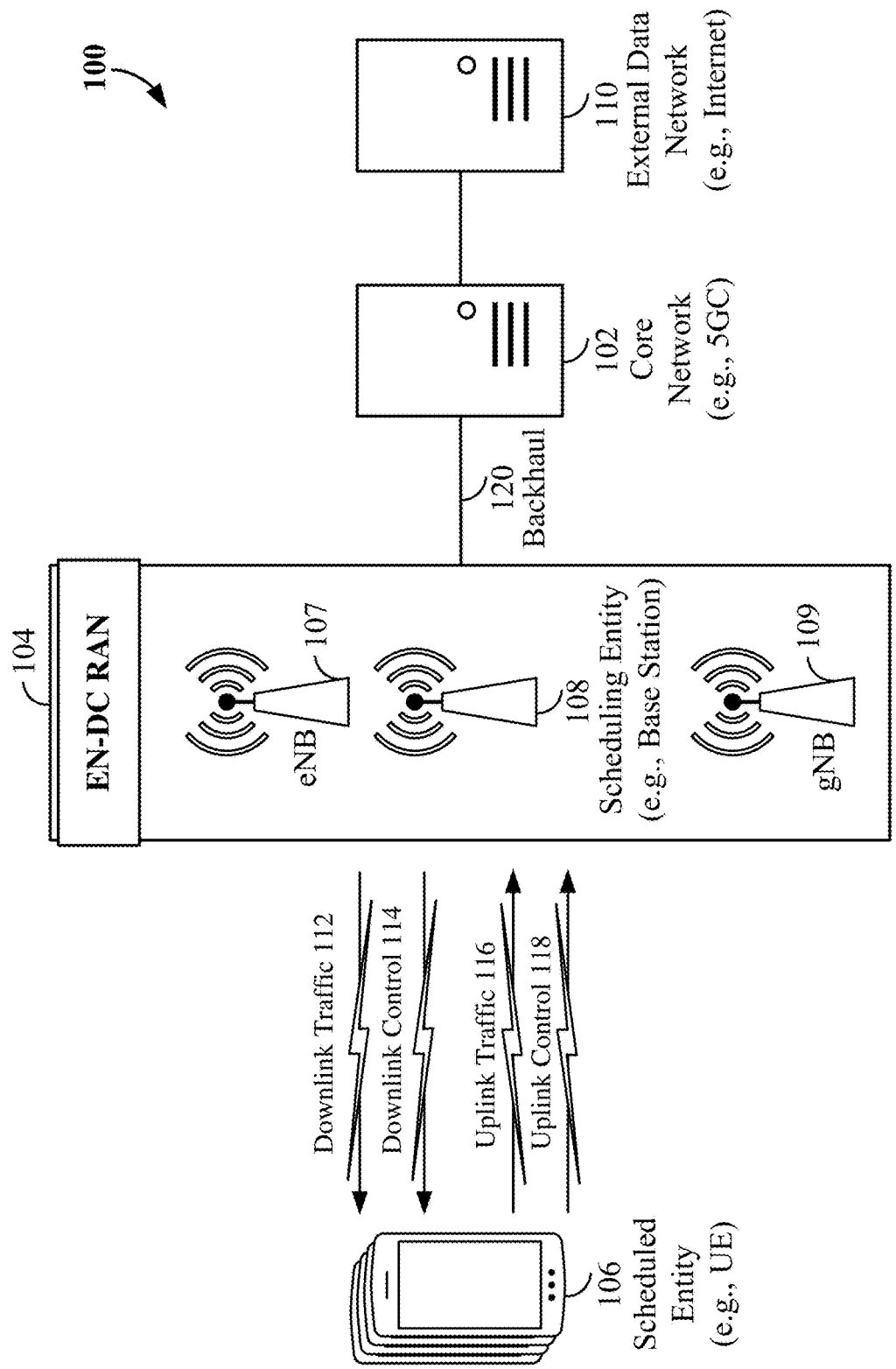
FIG. 1 is a schematic illustration of a wireless communication system according to some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The present disclosure enables a fifth-generation (5G) New Radio (NR) non-standalone (NSA) network using Evolved Universal Terrestrial Radio Access Network new radio dual-connectivity (EN-DC). In some aspects, a user equipment may connect to an EN-DC network using both a Long Term Evolution (LTE) anchor link and a 5G NR link. In some aspects of the disclosure, a user equipment (UE) can share some radio frequency (RF) circuitry components (e.g., antennas) between the LTE and NR links Aspects of the disclosure provide techniques for controlling or modifying NR sounding reference signal (SRS) transmissions and/or LTE communication (e.g., uplink/downlink operations) to avoid and/or mitigate interruption of LTE operations due to NR SRS transmissions. In some aspects, LTE links may use the FR1 band, and NR links may use any of the FR2, FR4, FR4-a or FR4-1, and/or FR5 bands.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure. In some examples, the RAN 104 may implement dual connectivity (e.g., EN-DC) that uses an LTE anchor link and one or more NR links. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In one example, the base station 108 may be an eNB that supports LTE connections, and the base station 109 may be a gNB that supports NR connections.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smartwatch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 107, 108 or 109) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106). In some aspects, the UE 106 can establish dual connectivity with the RAN 104 using EN-DC. For example, the UE 106 can establish an LTE anchor link with the eNB 107 and an NR link with the gNB 109.

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
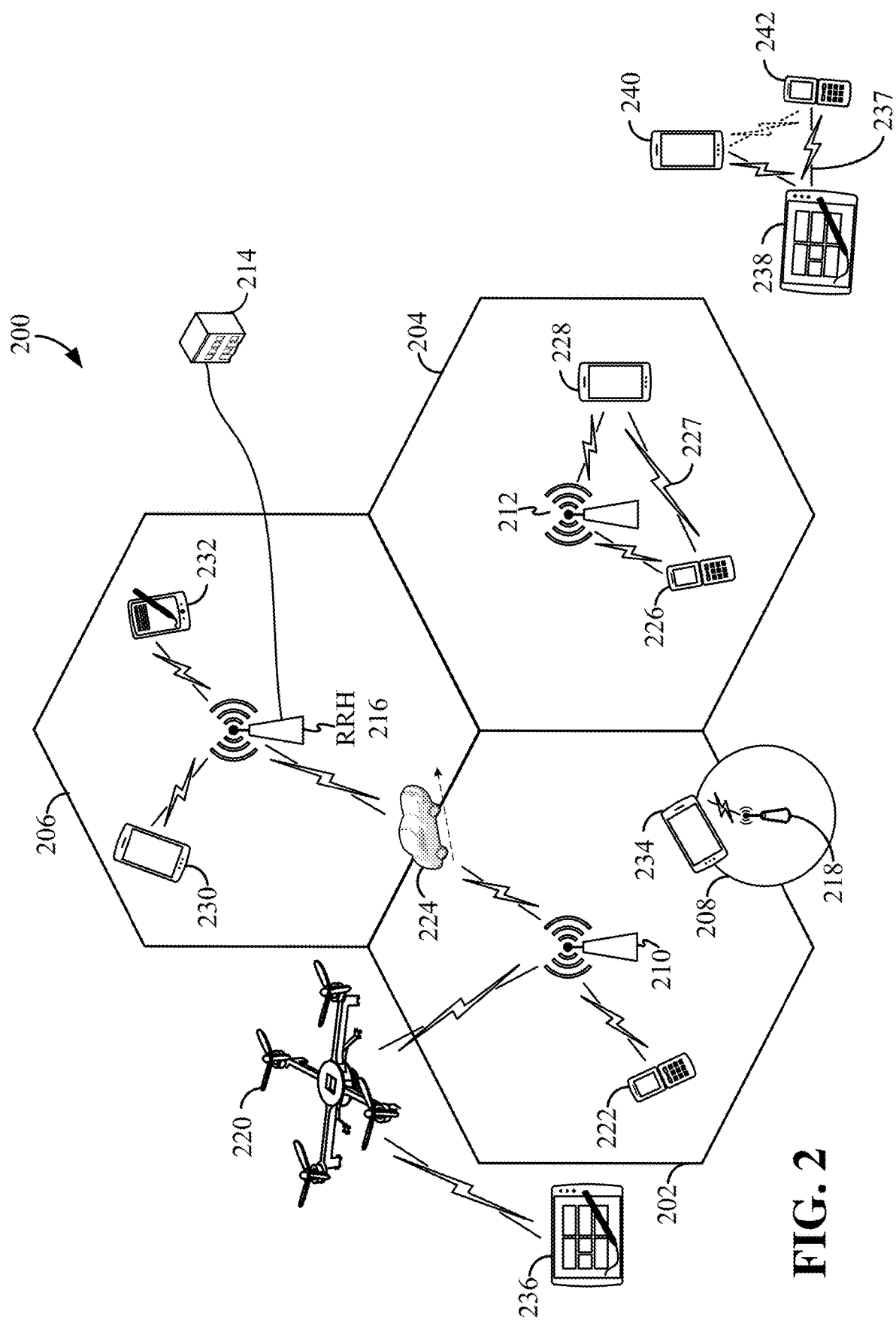
FIG. 2 is an illustration of an example of a radio access network according to some aspects of the present disclosure.

FIG. 2 is an illustration of an example of a radio access network (RAN) 200 according to some aspects of the disclosure. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell. In some examples, the RAN 200 may support EN-DC operations using one or more cells.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints. In some examples, the base stations of the RAN 200 may be configured to support LTE and/or NR connections to facilitate EN-DC operations. For example, the base stations 210, 212, 214, 218 may include a gNB and an eNB.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if the signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure the strength of a pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for the exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. A shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
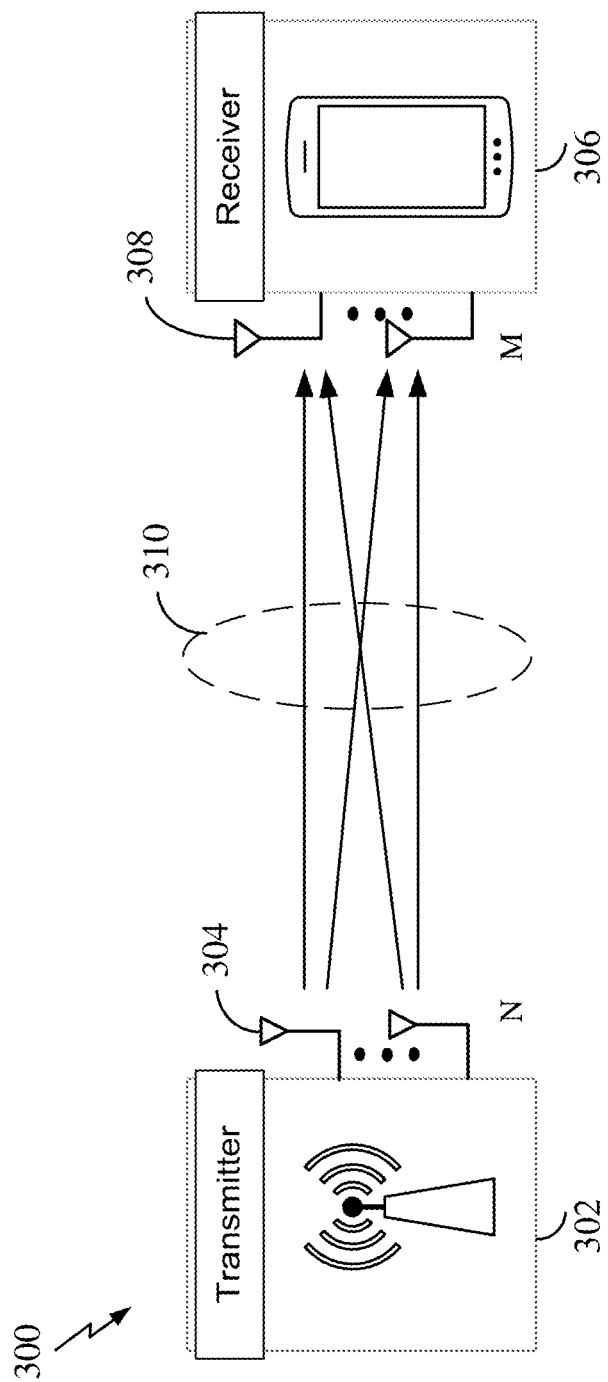
FIG. 3 is an illustration of an example of a wireless communication system using multiple antennas for wireless communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit CSI-RSs with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array module) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306.

In 5G New Radio (NR) systems, particularly for FR2 (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink signals and channels, including the physical uplink control channel (PUCCH), physical uplink shared channel (PUSCH), and sounding reference signal (SRS). In addition, beamformed signals may further be utilized in D2D systems, such as NR sidelink (SL) or V2X, utilizing FR2.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

In some examples, a frame refers to a predetermined duration (e.g., 10 ms for wireless transmissions, with each frame consisting of 10 subframes of 1 ms each). Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones of the carrier.

The resource grid 404 may be used to schematically represent time—frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Figure 4:
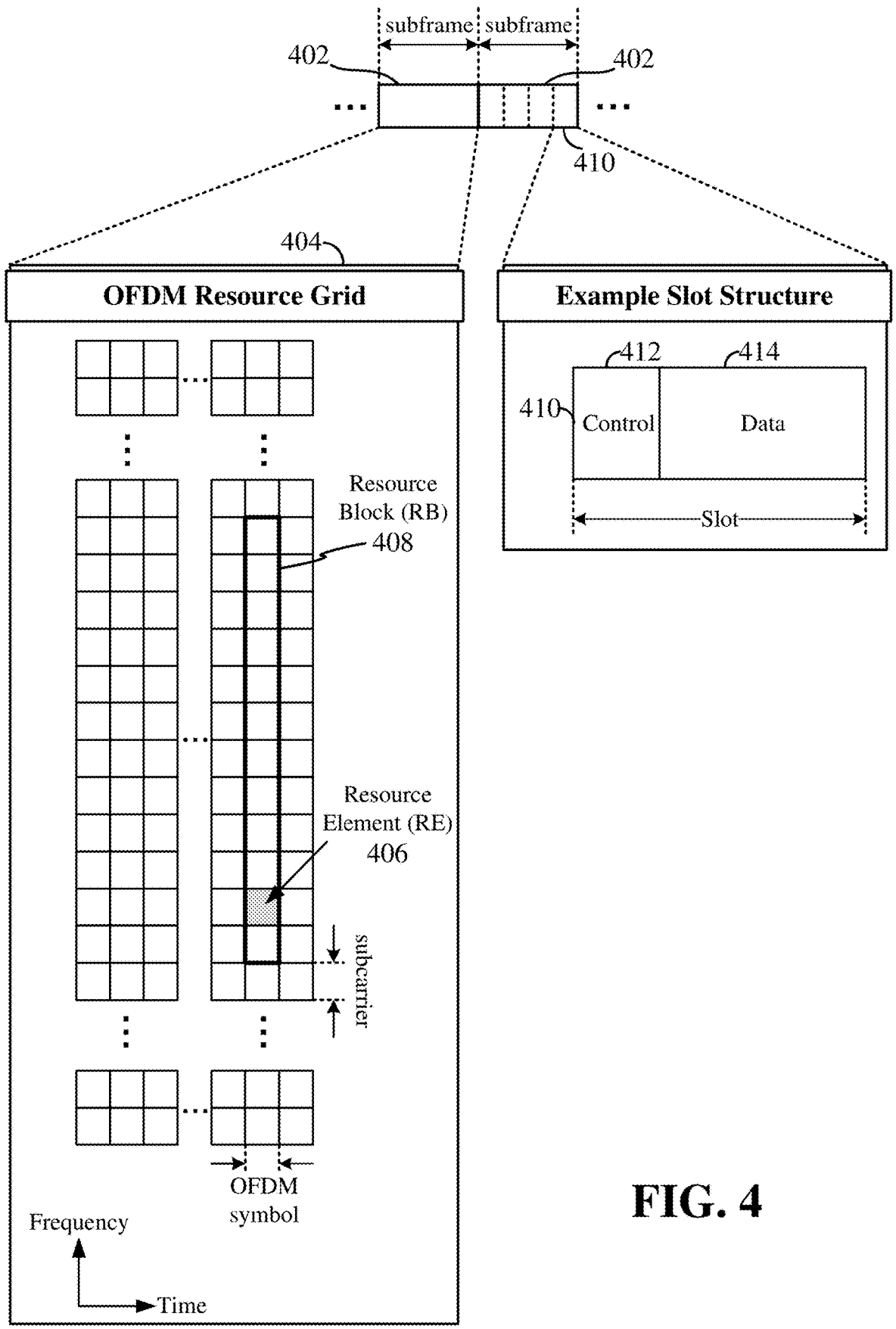
FIG. 4 is a schematic illustration of an organization of wireless resources in an air interface utilizing orthogonal frequency divisional multiplexing (OFDM) according to some aspects of the present disclosure.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices and a groupcast communication is delivered to a group of intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB and/or a sidelink CSI-RS, may be transmitted within the slot 410.

The channels or carriers described above and illustrated in FIGS. 1 and 2 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of resource blocks (RBs) in a given transmission.

Figure 5:
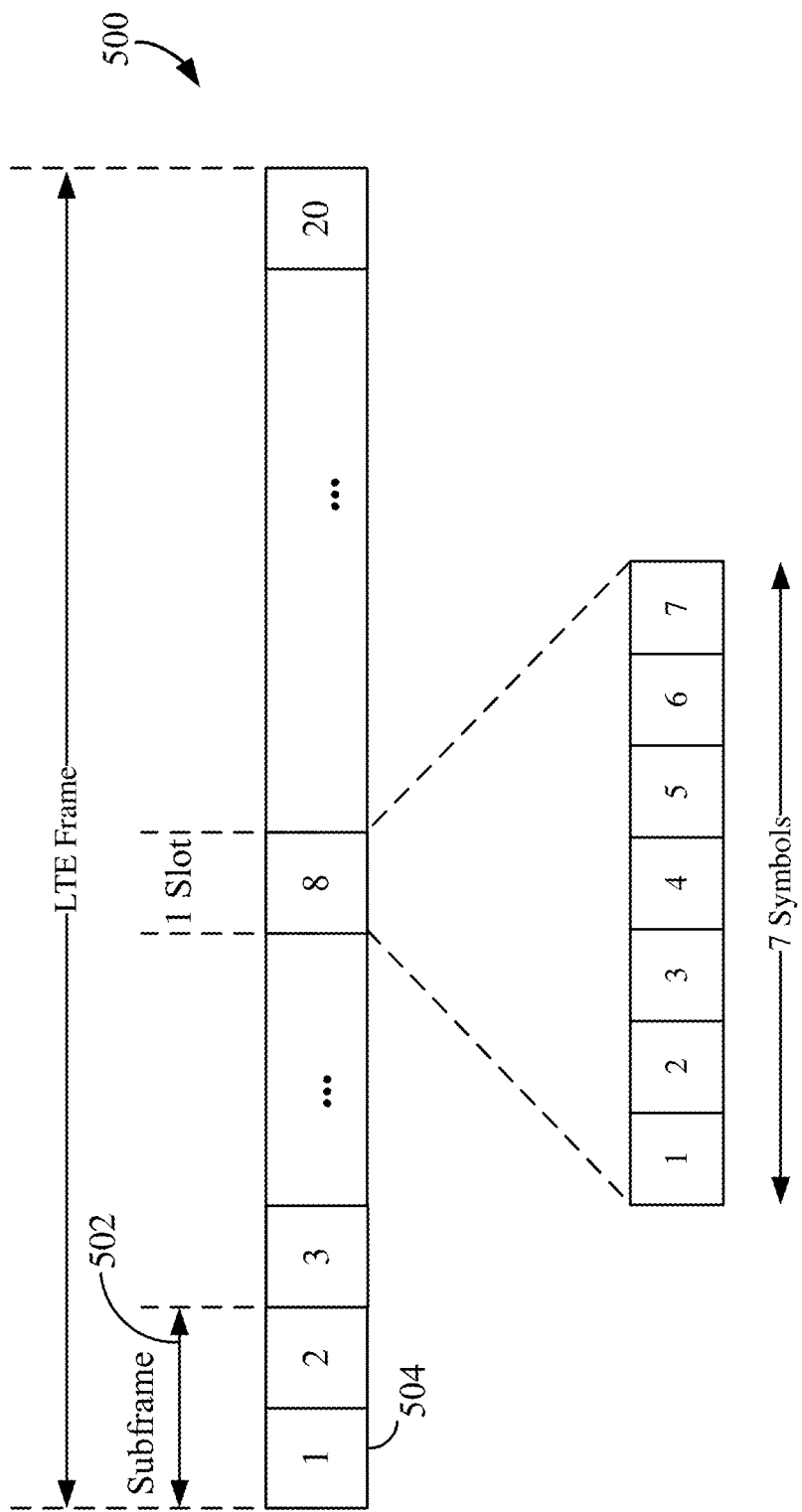
FIG. 5 is a diagram illustrating a Long Term Evolution (LTE) frame structure according to some aspects of the present disclosure.

Referring to FIG. 5, an exemplary LTE frame 500 may include ten subframes. Each subframe 502 includes two slots (e.g., slots 1 and 2), and each slot 504 may include 7 OFDM symbols depending on the cyclic prefix (CP) length. A scheduled entity 106 (e.g., UE) may receive or measure various downlink (DL) LTE control and reference signals from the network (e.g., eNB) using one or more LTE subframes. Some examples of control/reference signals are cell-specific reference signal (CRS), UE-specific reference signal (UE-RS), primary synchronization signals (PSS), secondary synchronization signals (SSS), physical broadcast channels (PBCH), etc. The scheduled entity 106 can also transmit various uplink (UL) LTE control and reference signals to the network using one or more LTE subframes.

Figure 6:
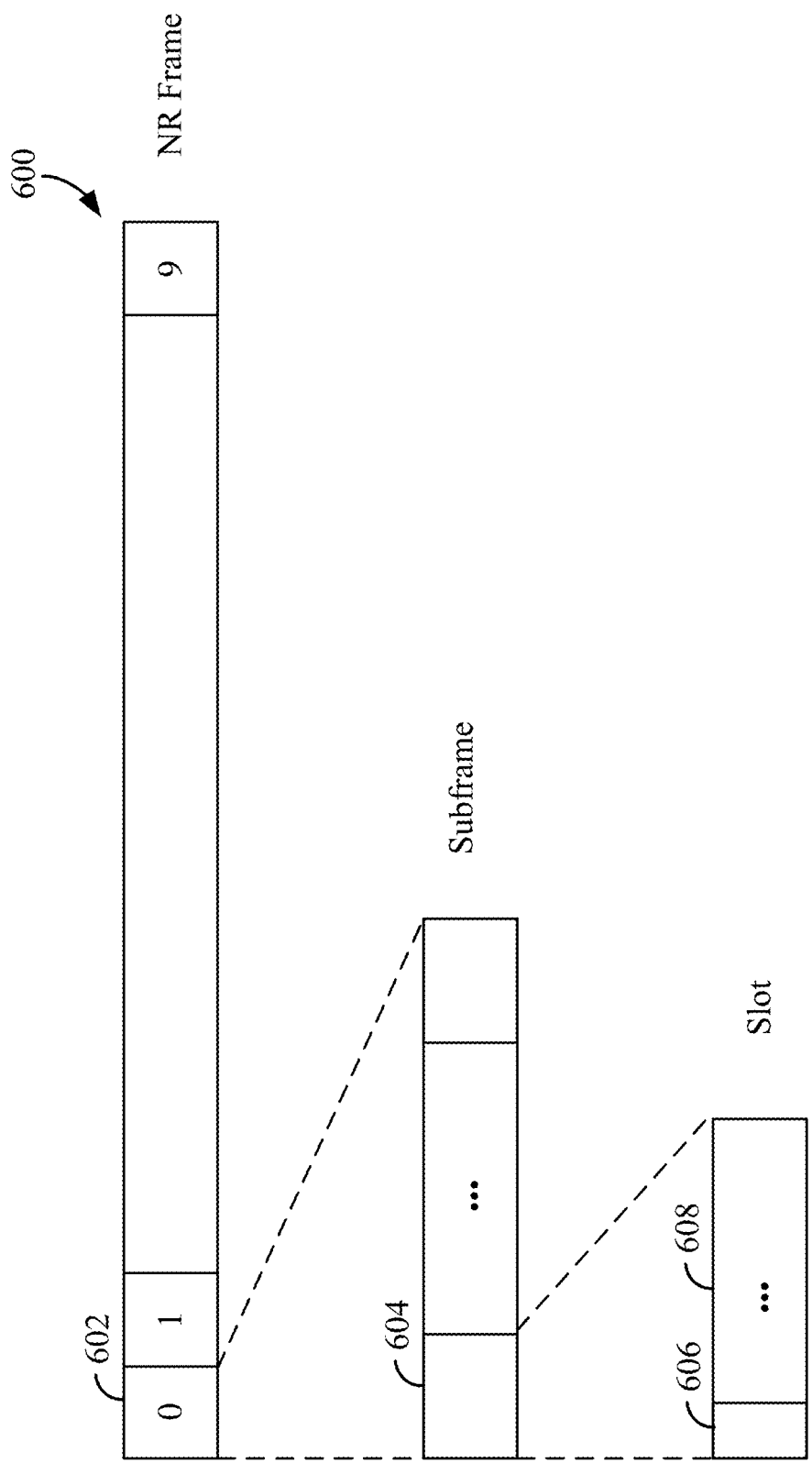
FIG. 6 is a diagram illustrating a New Radio (NR) frame structure according to some aspects of the present disclosure.

Referring to FIG. 6, an exemplary NR frame 600 can include 10 subframes (e.g., 1 ms subframe). Each subframe (e.g., subframe 602) includes a number of adjacent slots, and each slot (e.g., slot 604) includes a number of OFDM symbols. In some examples, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs. A NR slot may include a control region 606 and a data region 608. In general, the control region may carry control channels (e.g., physical downlink control channel (PDCCH) or physical uplink control channel (PUCCH)), and the data region may carry data channels (e.g., PDSCH or PUSCH). Of course, a slot may contain all downlink (DL), all uplink (UL), or at least one DL portion and at least one UL portion.

A transmitting apparatus (e.g., a UE or a scheduled entity 106) may use an UL NR slot (e.g., slot 604) to transmit UL control information (UCI), for example, uplink control 118 (see FIG. 1). The UCI can originate from higher layers via one or more UL control channels, such as a PUCCH, a physical random access channel (PRACH), etc., to the scheduling entity. Further, UL transmissions may carry UL physical signals that generally do not carry information originating from higher layers, such as reference signals, for example, demodulation reference signals (DM-RS), phase-tracking reference signals (PT-RS), sounding reference signals (SRS), etc. In some examples, the UL control information 118 may include a scheduling request (SR) (e.g., a request for the scheduling entity to schedule uplink transmissions). Here, in response to the SR transmitted on the control channel 118, the scheduling entity may transmit downlink control information (DCI) 114 that may schedule resources for uplink packet transmissions. In addition to control information, the scheduled entity may transmit or receive user data or traffic data in the data portion (e.g., data portion 608) of a slot. Such traffic may be carried on one or more traffic channels, such as, for a DL transmission, a physical downlink shared channel (PDSCH); or for an UL transmission, a physical uplink shared channel (PUSCH).

Figure 7:
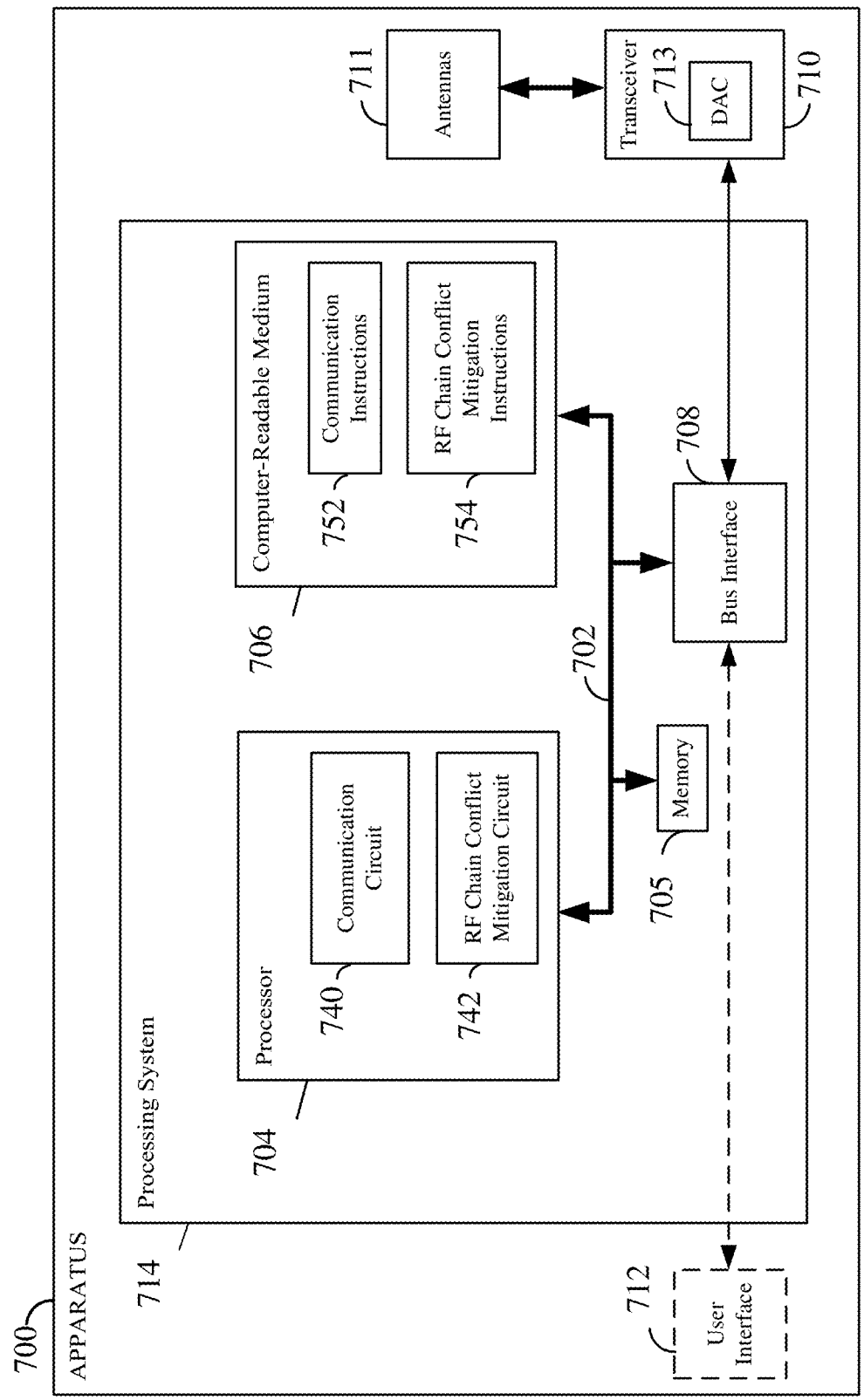
FIG. 7 is a block diagram illustrating an example of a hardware implementation for a wireless communication device according to some aspects of the disclosure.

FIG. 7 is a block diagram illustrating an example of a hardware implementation for a wireless apparatus 700 employing a processing system 714. For example, the apparatus 700 may be a user equipment (UE) as illustrated in any one or more of FIGS. 1, 2, 3, and/or 14.

The scheduling entity 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 700 may be configured to perform any one or more of the functions described herein. That is, the processor 704, as utilized in an apparatus 700, may be used to implement any one or more of the processes and procedures described below and illustrated in FIGS. 13-16.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium via a plurality of antennas 711.

The transceiver 710 may include multiple RF chains (e.g., LTE RF chains and NR RF chains) for signal transmission and reception using the antennas 711. The transceiver 710 may include one or more digital-to-analog converters (illustrated as DAC 713 in FIG. 7). A digital-to-analog converter (DAC) may convert digital data received from the processing system 714 and convert the data to an analog signal to be transmitted using the transceiver 710 and antennas 711. The processing system 714 may switch the connections between the RF chains and the antennas using one or more switches (not shown in FIG. 7) that may be included in the transceiver 710 or as separate units. Depending upon the nature of the apparatus, a user interface 712 (e.g., keypad, display, speaker, microphone, joystick) may also be provided. Of course, such a user interface 712 is optional, and may be omitted in some examples, such as a base station.

The processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706. The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 704 may include circuitry configured for various functions, including, for example, mitigating interruption between wireless connections of different RATs in an EN-DC network. For example, the circuitry may be configured to implement one or more of the functions and processes described below in relation to FIGS. 13-16. In some aspects, the processor 704 may include communication circuitry 740 and RF chain conflict mitigation circuitry 742.

The communication circuitry 740 may be configured to perform various functions related to wireless communication, including for example using dual connectivity (e.g., EN-DC) to communicate with a network (e.g., RAN 200) as described in relation to FIGS. 13-16. In some examples, the communication circuitry 740 may include one or more hardware components that provide the physical structure that performs processes related to wireless communication (e.g., signal reception and/or signal transmission) and signal processing (e.g., processing a received signal and/or processing a signal for transmission). In addition, the communication circuitry 740 may be configured to transmit and process uplink traffic and uplink control messages (e.g., similar to uplink traffic 116 and uplink control 118 of FIG. 1), receive and process downlink traffic and downlink control messages (e.g., similar to downlink traffic 112 and downlink control 114). The communication circuitry 740 may further be configured to execute communication instructions 752 stored on the computer-readable medium 706 to implement one or more functions described herein.

The RF chain conflict mitigation circuitry 742 may be configured to perform various functions, including for example mitigating RF chain conflict between different RATs (e.g., LTE and NR) as described in relation to FIGS. 13-16. In some examples, the RF chain conflict mitigation circuitry 742 may include one or more hardware components that provide the physical structure that performs processes related to RF chain conflict mitigation as described in relation to FIGS. 13-16. The RF chain conflict mitigation circuitry 742 may further be configured to execute RF chain conflict mitigation instructions 754 stored on the computer-readable medium 706 to implement one or more functions described herein.

Figure 8:
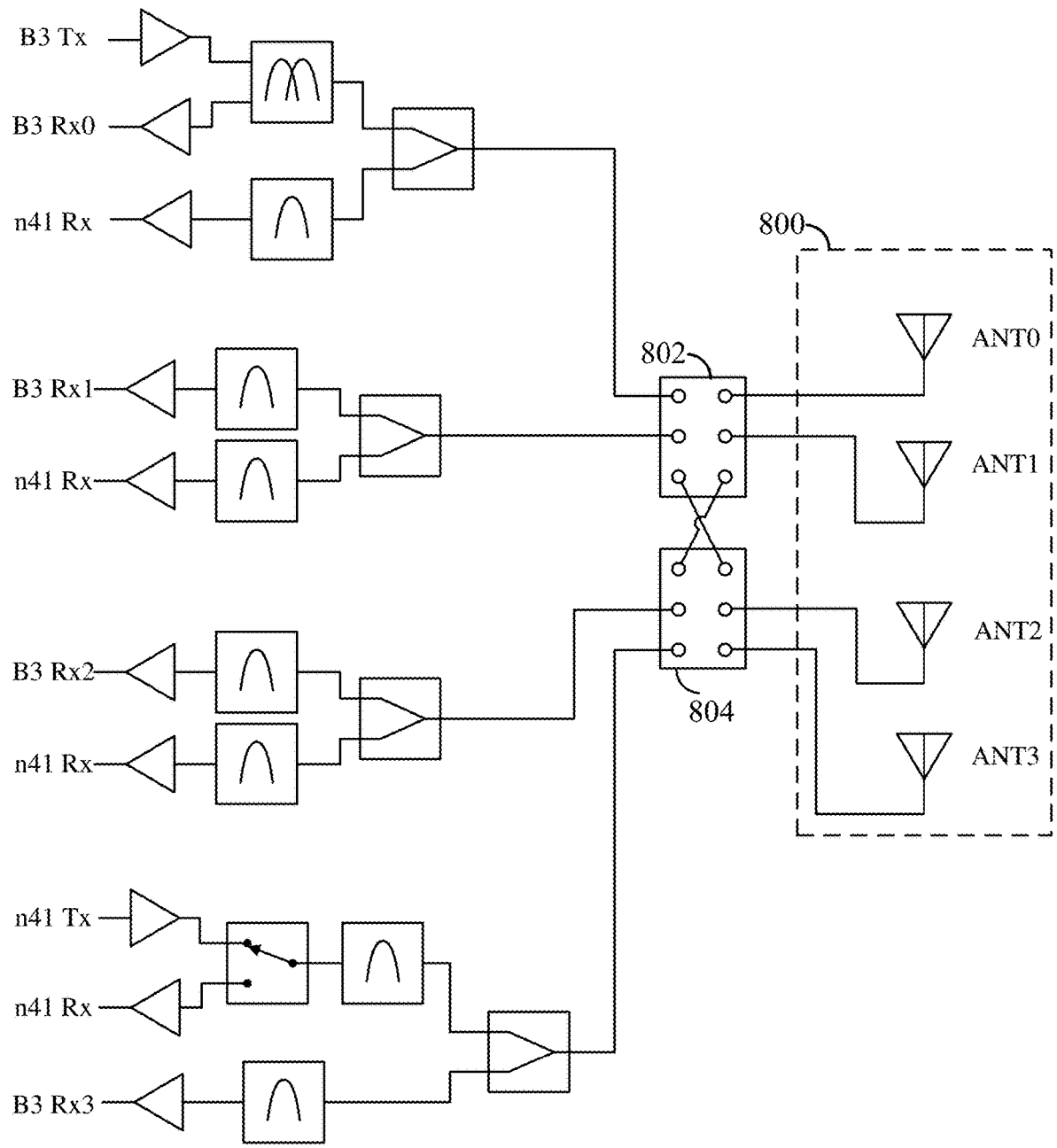
FIG. 8 is a diagram illustrating exemplary radio frequency (RF) chain components and antennas of a wireless communication device according to some aspects of the disclosure.

FIG. 8 is a diagram illustrating exemplary RF chain components of an apparatus according to some aspects of the disclosure. The apparatus may be any of the wireless communication devices, scheduled entities, or UEs illustrated in FIGS. 1, 2, 7, and/or 14. In one aspect, an EN-DC capable apparatus (e.g., UE) may share certain front-end radio frequency (RF) components, for example, antennas and switches, between LTE and NR connections or links to reduce cost and/or meet the desired form factor of the device. In FIG. 8, four exemplary antennas 800 (illustrated as ANT0, ANT1, ANT2, and ANT3) of the apparatus are shown for illustration. The apparatus may use switches (e.g., cross switches 802 and 804) to selectively connect the antennas 800 to the LTE RF chain B3 (illustrated as B3 Tx, B3 Rx0, B3 Rx1, B3 Rx2, and B3 Rx3) and NR RF chain n41 (illustrated as n41 Rx and n41 Tx). By controlling the cross switches, the scheduled entity can connect or disconnect an LTE or NR RF chain to or from any of the antennas. In other examples, the scheduled entity may have other configurations of RF chains, antennas, and cross switches.

Due to the sharing of RF chain components and antennas, potential conflicts between LTE and NR operations may occur. In one example, the apparatus may need to transmit SRS using antenna switching among different antennas. When the apparatus switches the connection between the NR Tx RF chain (e.g., n41 Tx) and the antennas (e.g., ANT0, ANT1, ANT2, and ANT3), the antenna switching operation can disrupt or interrupt the connection between the antennas and one or more LTE RF chains or Rx paths. This interruption can cause functional and/or performance problems on the LTE side, for example, failure to detect LTE cells, errors in signal and channel measurements (e.g., estimation of reference signal received power (RSRP)), handover failure, error in decoding of PBCH, etc.

Figure 9A:
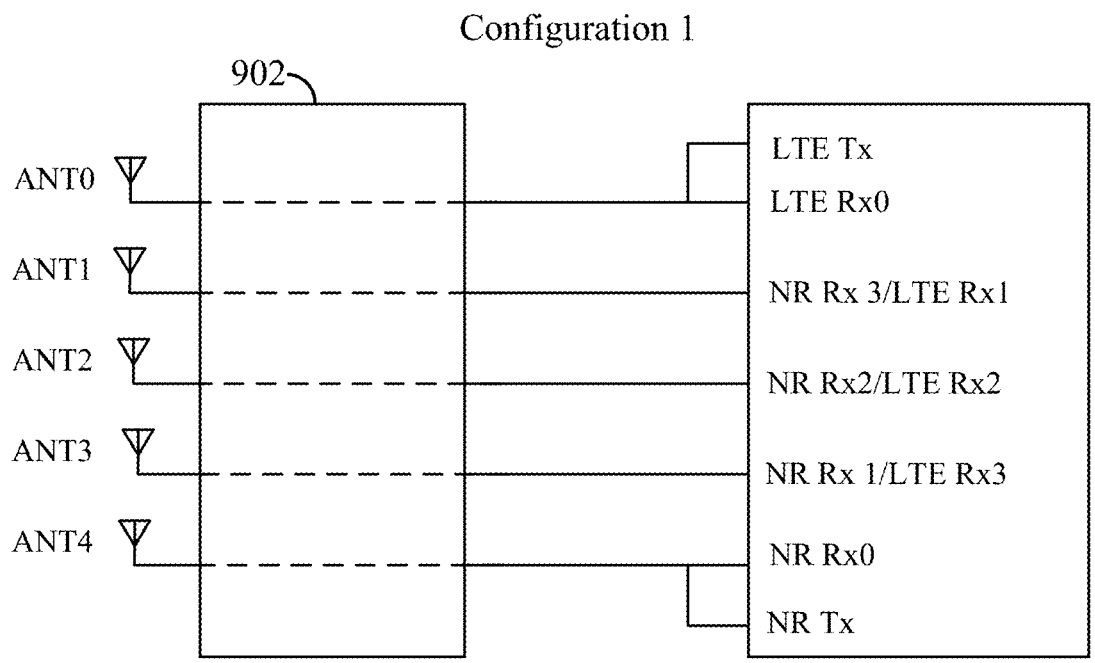
FIGS. 9A and 9B are diagrams illustrating an example of LTE RF chain interruption due to NR transmissions according to some aspects of the disclosure.
Figure 9B:
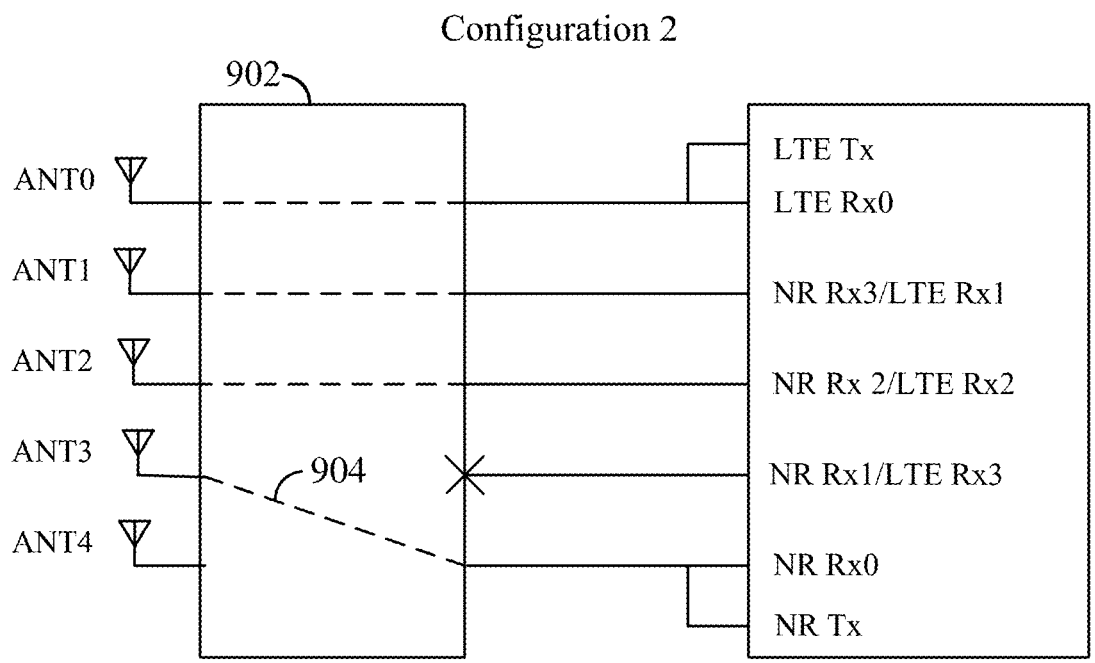

FIG. 9A and FIG. 9B illustrate an example of LTE RF chain interruption due to antenna switching for an NR SRS transmission according to some aspects of the disclosure. An apparatus (e.g., a scheduled entity, UE) can use an antenna switch 902 to share the same antennas (e.g., ANT0, ANT1, ANT2, ANT3, and ANT4) between LTE RF chains (e.g., LTE Tx/Rx0, LTE Rx1, LTE Rx2, LTE Rx3) and NR RF chains (e.g., NR Tx, NR Rx0, NR Rx1, NR Rx2, NR Rx3). In a default configuration (configuration 1), shown in FIG. 9A, the apparatus may configure the antenna switch 902 to connect the antennas to the respective NR/LTE RF chains. In this configuration, ANT0 may be shared by LTE Tx and LTE Rx0, ANT1 may be shared by NR Rx3 and LTE Rx1, ANT2 may be shared by NR Rx2 and LTE Rx2, ANT3 may be shared by NR Rx1 and LTE Rx3, and ANT4 may be shared by NR Rx0 and NR Tx. In one aspect, the antenna switch 902 may be similar to the cross switches 802 and 804 described in relation to FIG. 8.

When the apparatus transmits an NR SRS using a plurality of transmissions with antenna switching, the switching may disrupt the connection between the antennas and one or more LTE RF chains. For example, in another configuration (configuration 2) shown in FIG. 9B, the connection between ANT3 and LTE Rx3 is interrupted or disconnected when the apparatus switches the connection 904 of ANT3 from NR Rx1/LTE Rx3 to NR Tx for an SRS transmission using ANT3. In this case, the antenna switching operation for NR SRS transmissions can impact or disrupt LTE DL operations (e.g., LTE Rx3 got disconnected). In some cases, one or more LTE Rx chains may be affected by antenna switching. The impact or interruption to LTE DL operations may occur at any LTE symbol(s) when the respective LTE and NR operations are not be synchronized in time to avoid conflict. In some examples, depending on the NR SRS configuration, antenna switching may affect PSS, SSS, CRS, and/or PBCH operations partially or completely in one or more LTE symbols.

Figure 10:
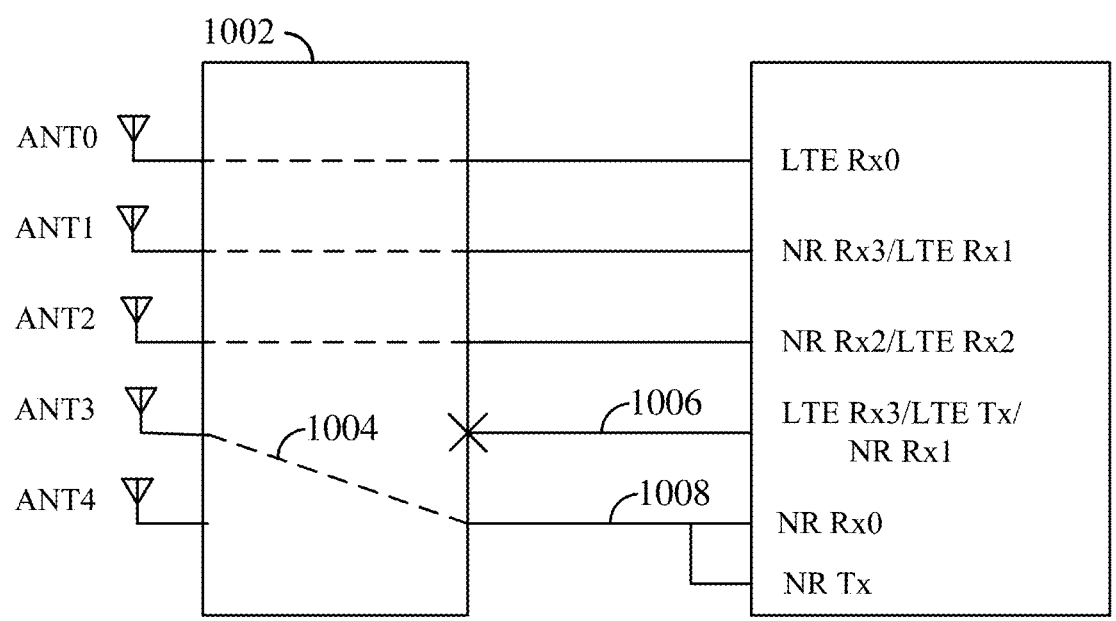
FIG. 10 is a diagram illustrating another example of LTE RF chain interruption due to NR transmissions according to some aspects of the disclosure.

In another aspect of the disclosure, when the apparatus transmits an NR SRS using a plurality of transmissions with antenna switching, the switching may disrupt an LTE Tx operation. In one example shown in FIG. 10, the apparatus may share an antenna (e.g., ANT3) for LTE Tx and NR Rx1. The apparatus can use an antenna switch 1002 to switch an antenna connection 1004 from an LTE Tx chain 1006 (e.g., LTE Tx) to an NR Tx chain 1008 for NR SRS transmissions. In this case, the NR SRS transmissions may interrupt the existing or ongoing LTE transmissions on that antenna (e.g., ANT3). To mitigate the interruption on LTE Tx, the apparatus may blank the LTE Tx communication during the interruption caused by antenna switching. In one blanking example, the apparatus may zero out the data input to a digital-to-analog convertor (e.g., DAC 713) that feeds the Tx signal to the LTE RF chain for the duration of the NR SRS transmissions.

Figure 11:
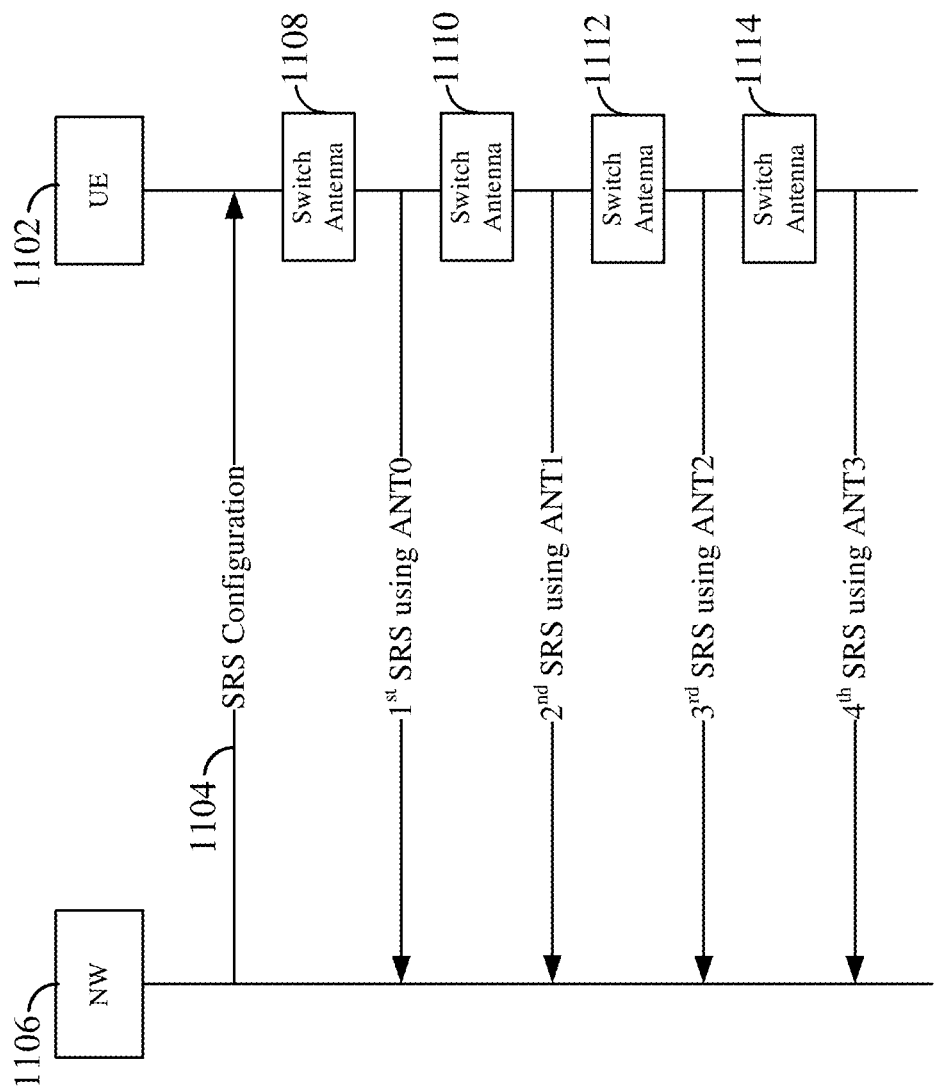
FIG. 11 is a diagram illustrating a process of SRS transmissions using antenna switching according to some aspects of the disclosure.

FIG. 11 is a diagram illustrating an exemplary switching order of antennas. An apparatus (e.g., UE 1102) receives an SRS configuration 1104 from the network 1106 (e.g., a base station, gNB, or eNB in RAN 200). In some aspects, the SRS configuration may include various parameters defining SRS resources (e.g., RBs) within one or more slots for transmitting the SRS according to a switching order of antennas. The apparatus may receive the SRS configuration from the network 1106 via radio resource control (RRC) and/or downlink control information (DCI) signaling. The SRS configuration may cause the apparatus to transmit the plurality of SRS transmissions in sequence while switching a transmit antenna among the plurality of antennas.

In one example, the apparatus may have four switching antennas (e.g., ANT0, ANT1, ANT2, and ANT3) similar to those described above in relation to FIGS. 8-10. The apparatus may switch the transmit antenna among the plurality of antennas when transmitting the SRS in sequence. For example, at 1108, the apparatus switches the transmit antenna and transmits a first SRS using ANT0. At 1110, the apparatus switches the transmit antenna and transmits a second SRS using ANT1. At 1112, the apparatus switches the transmit antenna and transmits a third SRS using ANT2. At 1114, the apparatus switches the transmit antenna and transmits a fourth SRS using ANT3. The first SRS, second SRS, third SRS, and fourth SRS are transmitted in sequence using a different antenna for each SRS. The apparatus switches the transmit antenna after each SRS transmission; therefore, a different antenna is used for each SRS transmission. In some aspects of the disclosure, the communication circuit 740 can provide a means for determining that the switching of the transmit antenna can disrupt the ability of the apparatus to use the plurality of antennas for a scheduled downlink or uplink operation of the second RAT (e.g., LTE). In that case, the apparatus can modify LTE communication and/or the NR SRS transmissions to mitigate disruption of the LTE communication due to the switching order of the plurality of antennas.

Figure 12:
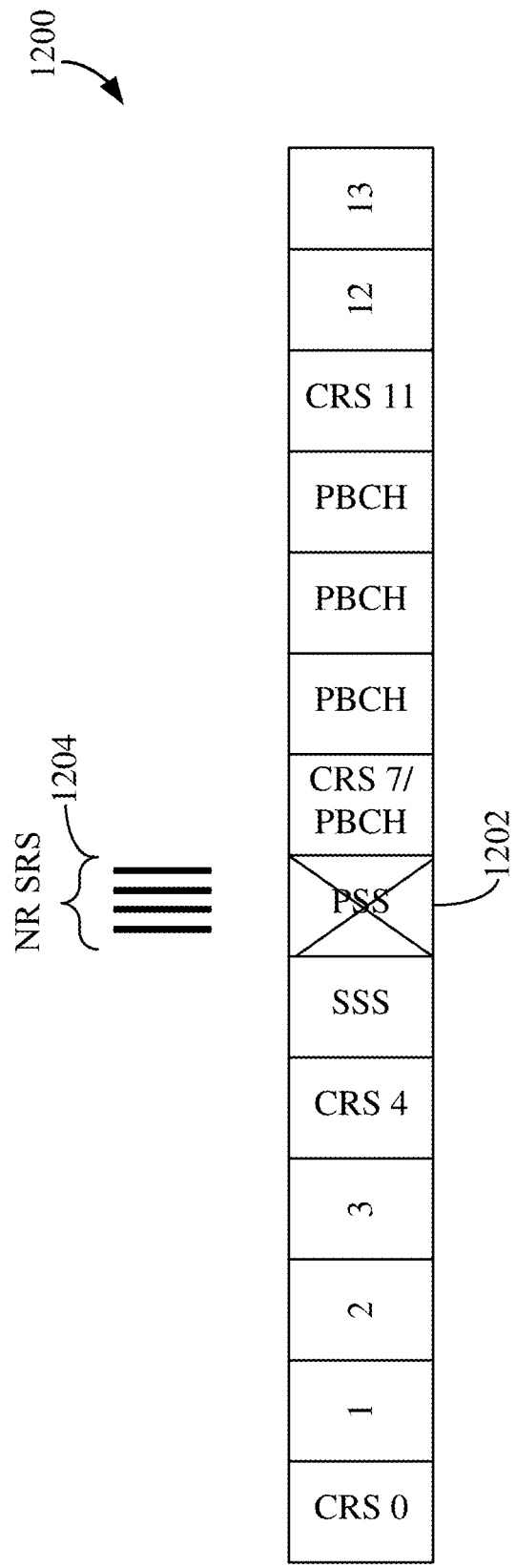
FIG. 12 is a diagram illustrating an exemplary LTE downlink subframe that experiences antenna blocking due to NR transmissions.

FIG. 12 is a diagram illustrating an example of LTE DL interruption due to NR SRS transmission. In this example, an apparatus (e.g., scheduled entity or UE) can receive an LTE DL frame 1200 from a network. The frame 1200 may include various LTE signals and channels, for example, CRS 0, CRS 4, CRS 7, CRS 11, SSS, PSS, and PBCH, at different symbols. In one example, during the reception of a PSS 1202 in the LTE frame 1200, the apparatus may transmit NR SRS 1204 using antenna switching during a time duration that overlaps the PSS 1202. In this case, antenna switching can disrupt the connection between an antenna (e.g., ANT3 in FIGS. 9 and 10) and an LTE RF chain for receiving the PSS 1202. Therefore, the reception or detection of PSS 1202 may be impacted, disrupted, or blocked by the NR SRS transmission due to antenna switching.

Figure 13:
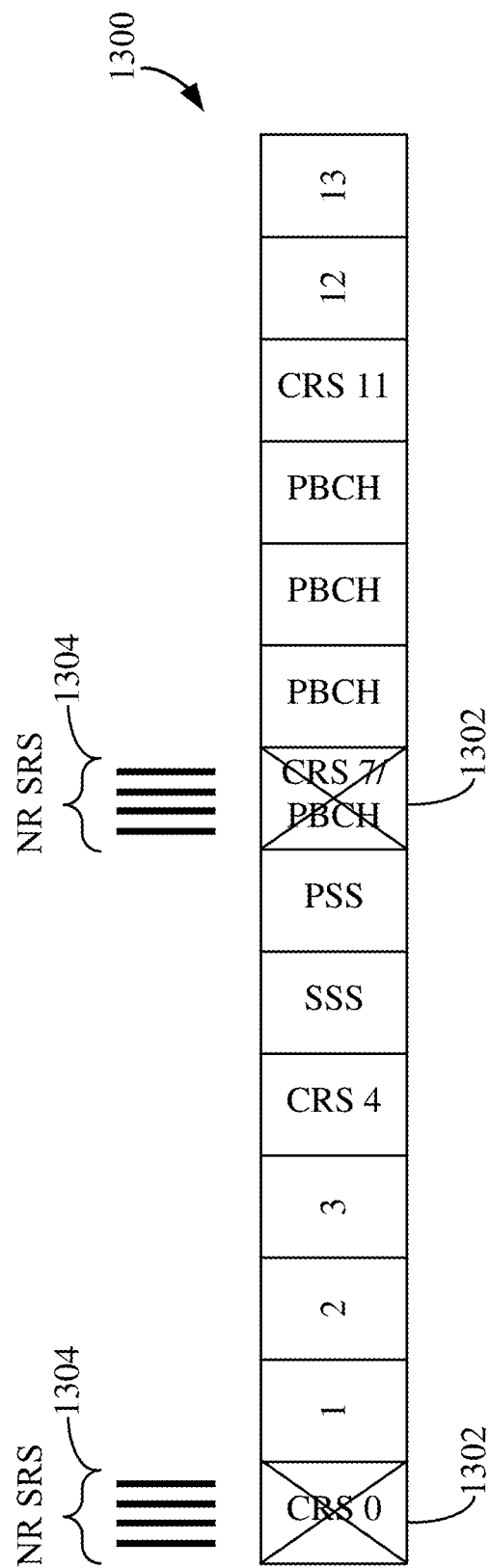
FIG. 13 is a diagram illustrating another exemplary LTE downlink subframe that experiences antenna blocking due to NR transmissions.

FIG. 13 is a diagram illustrating another example of LTE DL interruption due to NR SRS transmission. In this example, an apparatus (e.g., a scheduled entity or UE) can receive an LTE DL frame 1300 from a network. The frame 1300 may include various LTE signals and channels for example, CRS 0, CRS 4, CRS 7, CRS 11, SSS, PSS, and PBCH, at different symbols. In one example, during the reception or detection of one or more LTE reference signals 1302 (e.g., CRS 0 and CRS 7), the apparatus may transmit NR SRS 1304 using antenna switching during a time duration that overlaps the LTE signals 1302. In this case, antenna switching can impact, disrupt, or block the Rx connection between an antenna (e.g., ANT3 in FIGS. 9 and 10) and an LTE RF chain for receiving the LTE reference signals (e.g., CRS 0 and CRS 7). When the apparatus cannot receive or detect the LTE reference signals (e.g., CRS 0 and CRS 7), the apparatus may not be able to accurately estimate or measure the channel or signal quality (e.g., RSRP) that can affect cell selection, reselection, and handover.

Figure 14:
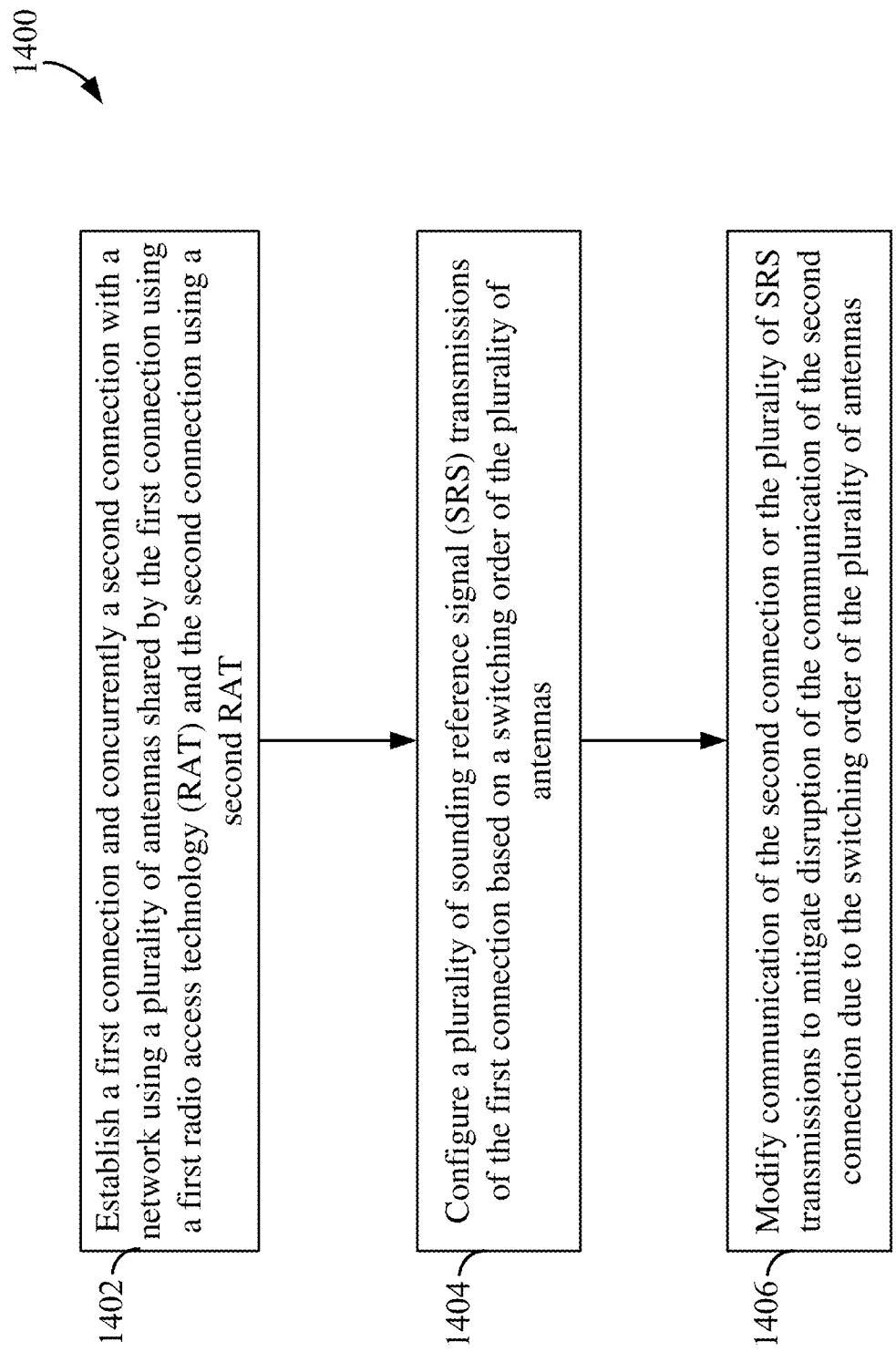
FIG. 14 is a flow chart illustrating an exemplary process for mitigating LTE interruption due to NR SRS transmissions according to some aspects of the disclosure.

FIG. 14 is a flow chart illustrating an exemplary process 1400 for mitigating interruption to LTE communication due to NR SRS transmissions using antenna switching according to some aspects of the present disclosure. As described below, some or all illustrated features may be omitted in a particular implementation within the scope of the present disclosure, and some illustrated features may not be required for the implementation of all embodiments. In some examples, the process 1400 may be carried out by the apparatus 700 illustrated in FIG. 7. In some examples, the process 1400 may be carried out by any suitable apparatus (e.g., a scheduled entity or UE) or means for carrying out the functions or algorithm described below.

At block 1402, an apparatus may establish a first connection and concurrently a second connection with a network using a plurality of antennas shared by the first connection using a first radio access technology (RAT) and the second connection using a second RAT. The apparatus can concurrently maintain the first connection and the second connection with the network. In one aspect, the network may be the RAN 200 described above in relation to FIG. 2 or any network that supports dual connectivity communication (e.g., EN-DC). The dual connectivity may include the first connection of the first RAT and the second connection of the second RAT. In one example, the first RAT may be NR, and the second RAT may be LTE. In one aspect, the communication circuitry 740 and transceiver 710 can provide a means for establishing the first connection and the second connection that share the plurality of antennas 711.

Figure 15:
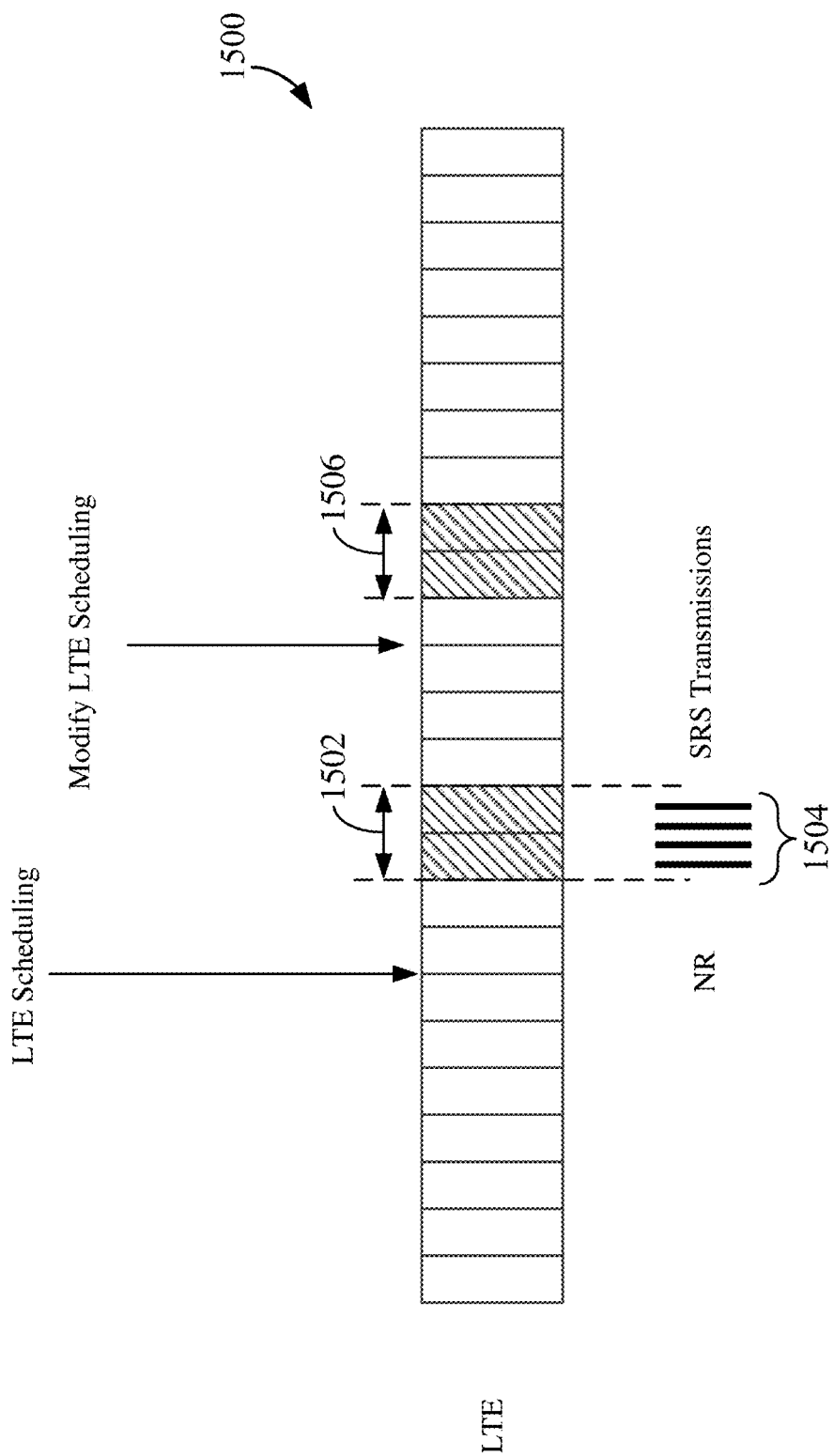
FIG. 15 is a diagram illustrating a first procedure for mitigating interruption to LTE DL communication according to some aspects of the disclosure.

At block 1404, the apparatus may configure a plurality of sounding reference signal (SRS) transmissions of the first connection (e.g., NR connection) based on a switching order of the plurality of antennas that may disrupt the second connection (e.g., LTE connection). In one example, FIG. 15 illustrates an LTE subframe 1500 in which the apparatus (e.g., UE) may be scheduled to search, receive, and/or measure certain LTE DL signals (e.g., PSS, SSS, PBCH, CRS, etc.) during a time interval 1502 that may overlap one or more NR SRS transmissions 1504. In another example, the apparatus may be scheduled to transmit an LTE UL signal (e.g., PUCCH or PUCCH) during the time interval 1502. However, switching the transmit antenna for transmitting the SRS transmissions may disconnect an antenna from an LTE RF chain that is configured for the scheduled LTE DL/UL operation.

At block 1406, the apparatus may modify the communication (downlink and/or uplink transmissions) of the second connection (e.g., LTE connection) or the plurality of SRS transmissions to mitigate disruption of the communication of the second connection due to the switching order of the plurality of antennas. Mitigating the disruption can avoid an overlap in time between the plurality of SRS transmissions of the first connection (e.g., NR connection) and the communication of the second connection (e.g., LTE connection). In one aspect, the RF chain conflict mitigation circuit 742 can provide a means for modifying the communication of the second connection and/or the plurality of SRS transmissions to mitigate the disruption between the communication of the second connection and the SRS transmissions of the first connection.

Figure 16:
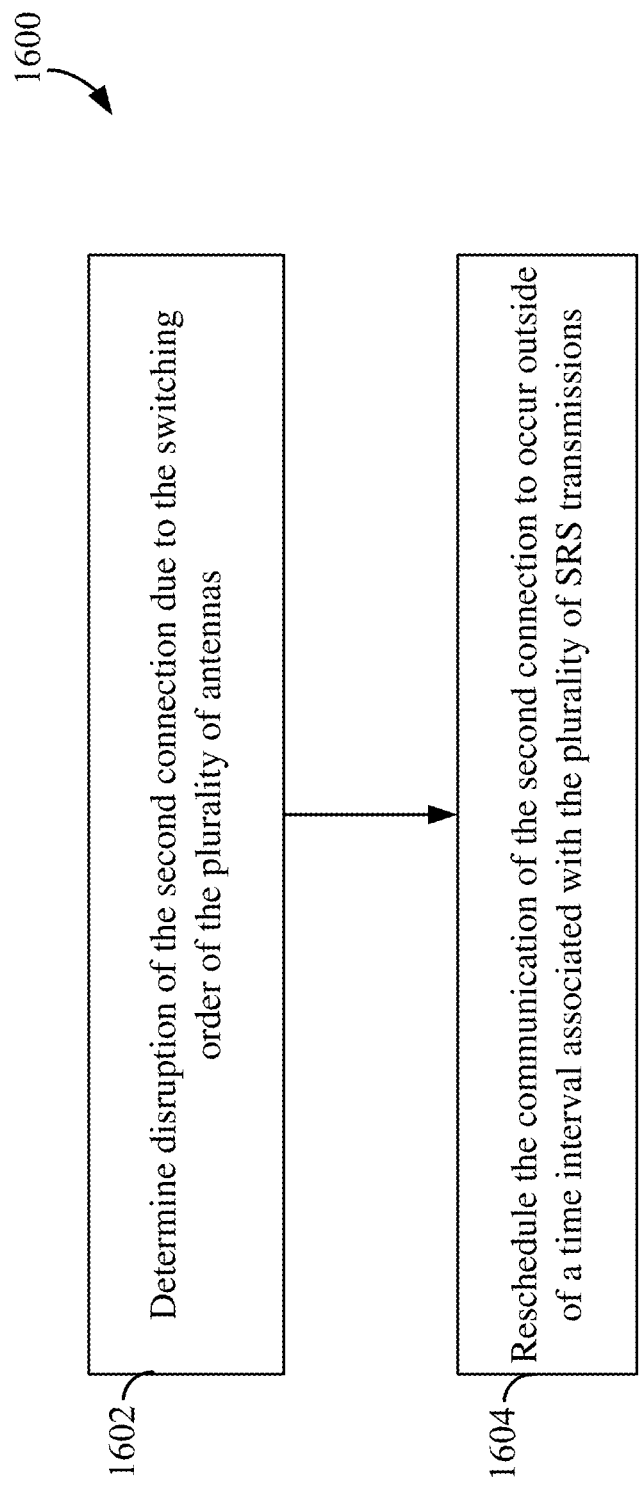
FIG. 16 is a flow chart illustrating a method of rescheduling LTE communication to mitigate a disruption between LTE communication and NR SRS transmissions according to some aspects of the disclosure.

FIG. 16 is a flow chart illustrating a method of mitigating a disruption between the communication of the second connection and the SRS transmissions of the first connection according to some aspects. At block 1602, the apparatus can determine that communication on the second connection (e.g., LTE connection) can be disrupted due to the switching order of the plurality of antennas for transmitting NR SRS on the first connection (e.g., NR connection). At block 1604, the apparatus can reschedule the communication of the second connection to occur outside of a time interval associated with the plurality of NR SRS transmissions. For example, the apparatus may modify the communication of the second connection by rescheduling the search, reception, and/or measurement of certain LTE DL signals to a different time interval 1506 (see FIG. 15) that does not overlap with the NR SRS transmissions 1504.

Figure 17:
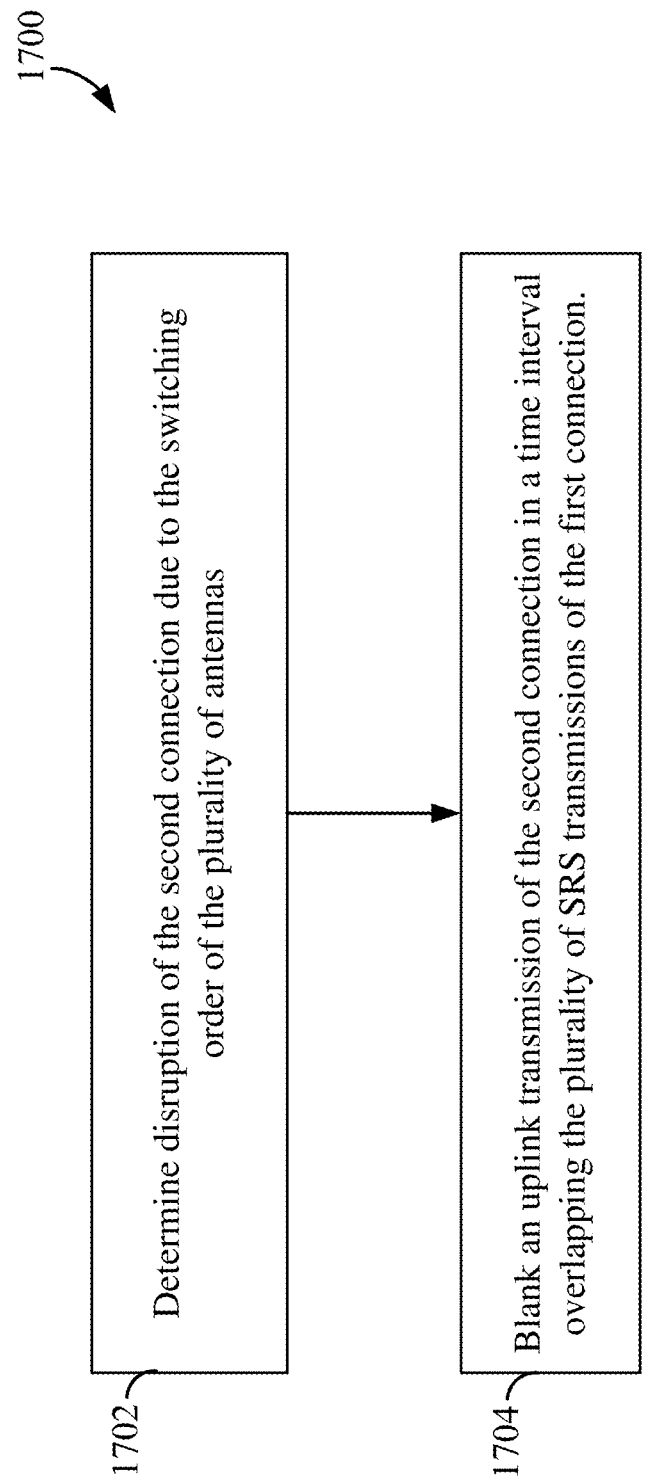
FIG. 17 a flow chart illustrating a method of blanking LTE transmission to mitigate a disruption between LTE communication and NR SRS transmissions according to some aspects of the disclosure.
Figure 18:
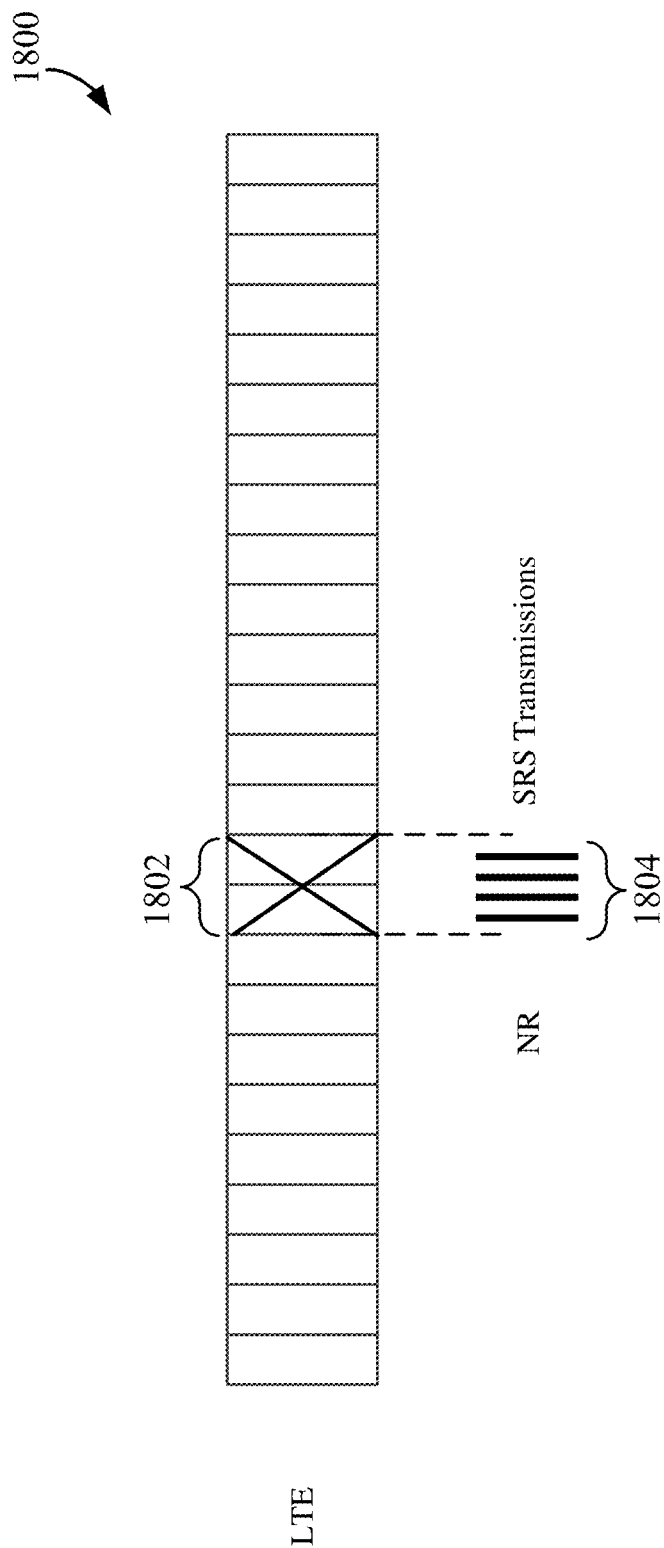
FIG. 18 is a diagram illustrating a blanking procedure for mitigating interruption to LTE UL communication according to some aspects of the disclosure.

FIG. 17 is a flow chart illustrating another method of mitigating a disruption between the communication of the second connection and the SRS transmissions of the first connection according to some aspects. At block 1702, the apparatus can determine that communication on the second connection (e.g., LTE connection) can be disrupted due to the switching order of the plurality of antennas for transmitting NR SRS on the first connection. At block 1704, the apparatus can blank an uplink transmission of the second connection in a time interval overlapping the plurality of SRS transmissions of the first connection. For example, in FIG. 18, the apparatus may modify the communication of an LTE frame 1800 by blanking an LTE UL transmission 1802 during a time interval that overlaps the NR SRS transmissions 1804. Blanking the LTE UL transmission can mitigate the disruption of the LTE RF chain due to antenna switching.

Figure 19:
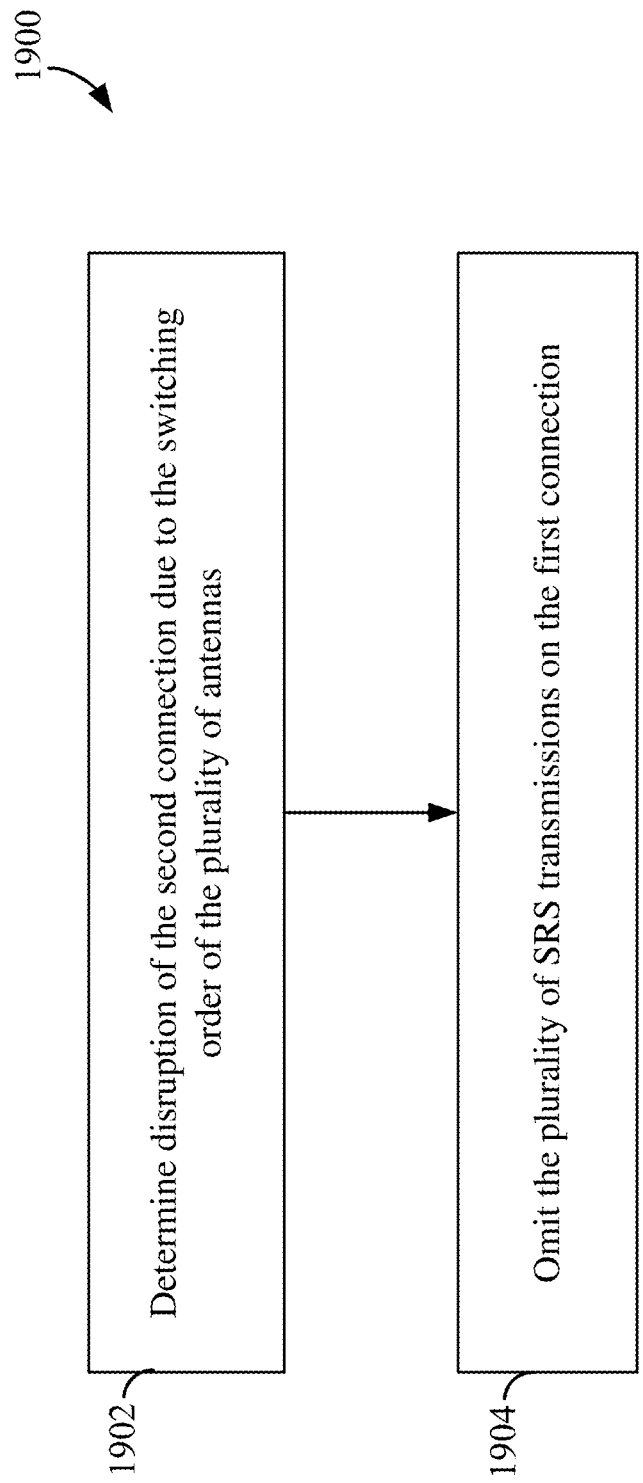
FIG. 19 is a flow chart illustrating a method of omitting NR SRS transmissions to mitigate a disruption between LTE communication and NR SRS transmissions according to some aspects of the disclosure.

FIG. 19 is a flow chart illustrating another method of mitigating a disruption between the communication of the second connection and the SRS transmissions of the first connection according to some aspects. At block 1902, the apparatus can determine that communication on the second connection (e.g., LTE connection) can be disrupted due to the switching order of the plurality of antennas for transmitting NR SRS on the first connection. At block 1904, the apparatus may modify the plurality of SRS transmissions, for example, by omitting the plurality of SRS transmissions in a predetermined time interval to avoid disrupting the communication of the second connection (LTE connection) in the predetermined time interval.

Figure 20:
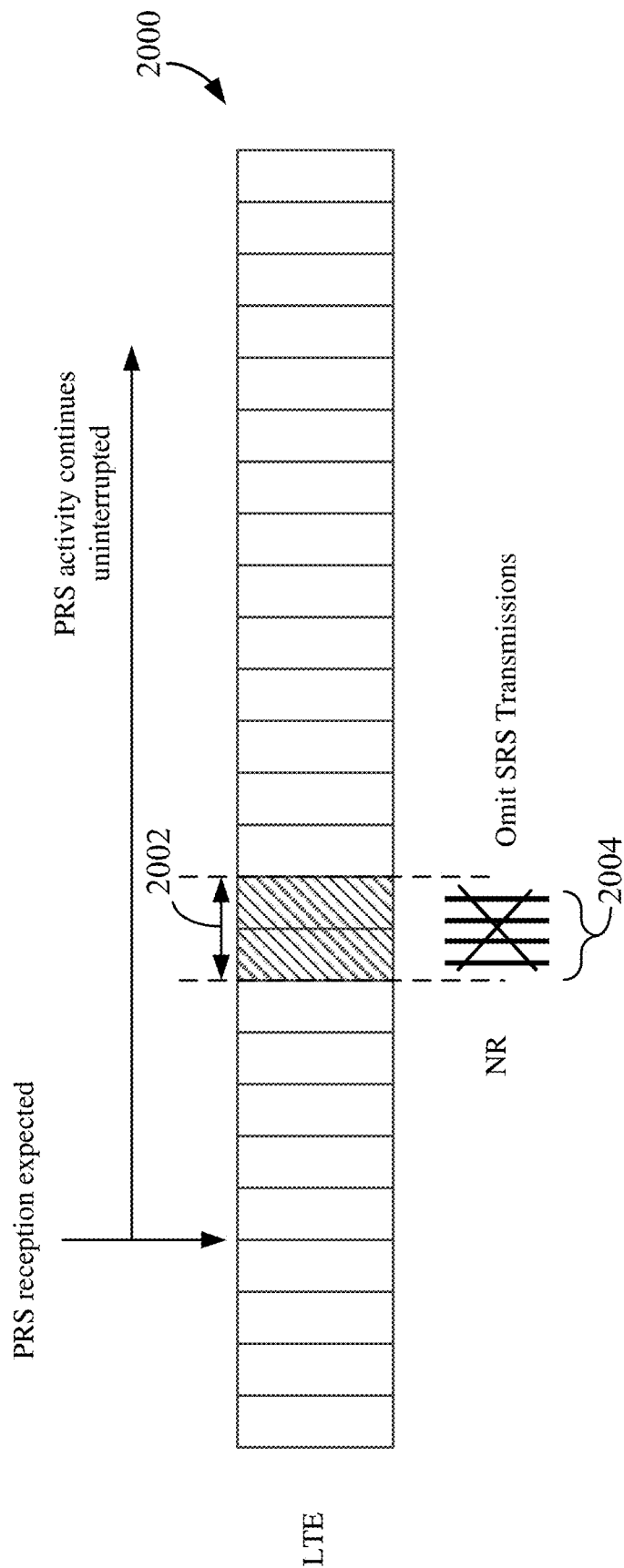
FIG. 20 is a diagram illustrating a procedure for omitting NR SRS transmission according to some aspects of the disclosure.

In an exemplary LTE frame 2000 shown in FIG. 20, the apparatus may expect to receive, detect, or measure certain LTE DL signals in a time interval 2002 that may overlap NR SRS transmissions 2004. In one example, the apparatus may transmit an LTE UL signal during the time interval 2002. In some cases, it may not be desirable or possible to reschedule, modify, or interrupt the LTE operations in the time interval 2002. For example, the apparatus may be scheduled to search, detect, measure, and/or receive some high priority LTE signals. One example of high priority LTE signals may be signaling that are used for enhanced 911 (E911) services. One such high priority signal used for E911 service is the positioning reference signal (PRS) that may be used by the scheduled entity to determine its physical location. Therefore, the disruption of LTE operation is undesirable, for example, during a handover scenario. In that case, disruption of LTE operation may cause handover failure and/or loss of network connection. Therefore, the apparatus can omit the NR SRS transmissions 2004 and perform no associated antenna switching to avoid disrupting the LTE UL.

In some aspects of the disclosure, an apparatus (e.g., a scheduled entity or UE) may use any combinations of the methods and processes described above in relation to FIGS. 14-20 to mitigate interruption to LTE communication due to NR SRS transmissions. In one example, the apparatus may use a first implementation of the method of FIG. 14 in a first subframe/slot, and use a second implementation of the method of FIG. 14 in a second subframe/slot that may be before or after the first subframe/slot.

In one configuration, the apparatus 700 for wireless communication includes means for performing various dual connectivity interruption mitigation functions, processes, methods, and procedures described in this disclosure. In one aspect, the aforementioned means may be the processor 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 2, 3, and/or 11, and utilizing, for example, the processes and/or algorithms described herein in relation to FIGS. 14-20.

In a first aspect, a method of wireless communication at an apparatus is disclosed. The method comprises: establishing a first connection and concurrently a second connection with a network using a plurality of antennas shared by the first connection using a first radio access technology (RAT) and the second connection using a second RAT; configuring a plurality of sounding reference signal (SRS) transmissions of the first connection based on a switching order of the plurality of antennas; and modifying communication of the second connection or the plurality of SRS transmissions to mitigate disruption of the communication of the second connection due to the switching order of the plurality of antennas.

In a second aspect, alone or in combination with the first aspect, wherein the communication of the second connection comprises receiving at least one of a primary synchronization signal (PSS), a secondary synchronization signal (SSS), a cell-specific reference signal (CRS), or a physical broadcast channel (PBCH).

In a third aspect, alone or in combination with any of the first to second aspects, wherein the modifying the communication of the second connection comprises: rescheduling the communication of the second connection to occur outside of a time interval associated with the plurality of SRS transmissions.

In a fourth aspect, alone or in combination with any of the first to third aspects, wherein the modifying the communication of the second connection comprises: blanking an uplink transmission of the second connection in a time interval overlapping the plurality of SRS transmissions of the first connection.

In a fifth aspect, alone or in combination with any of the first to fourth aspects, the method further comprises: transmitting the plurality of SRS transmissions in sequence while switching a transmit antenna based on the switching order of the plurality of antennas.

In a sixth aspect, alone or in combination with the fifth aspect, the method further comprises: determining that the switching of the transmit antenna disrupts an ability of the apparatus to use at least one of the plurality of antennas for the communication of the second connection.

In a seventh aspect, alone or in combination with any of the fifth to sixth aspects, wherein the transmitting the plurality of SRS transmissions comprises: disconnecting a first antenna of the plurality of antennas from a radio frequency (RF) chain of the second RAT during a time interval corresponding to the communication of the first connection; and connecting the first antenna to an RF chain of the first RAT during the time interval.

In an eighth aspect, alone or in combination with any of the first to fourth aspects, wherein the modifying the plurality of SRS transmissions comprises: omitting the plurality of SRS transmissions in a predetermined time interval to avoid disrupting the communication of the second connection in the predetermined time interval.

In a ninth aspect, alone or in combination with any of the first through eighth aspects, wherein the communication of the second connection comprises receiving a positioning reference signal (PRS) from the network.

In a tenth aspect, alone or in combination with any of the first through ninth aspects, wherein the communication of the second connection comprises a handover operation of the second connection.

In an eleventh aspect, alone or in combination with any of the first through tenth aspects, wherein the first connection comprises a long term evolution (LTE) connection between the apparatus and the network, and the second connection comprises a New Radio (NR) connection between the apparatus and the network, and wherein the LTE connection and the NR connection are configured to provide evolved universal terrestrial radio access network new radio dual-connectivity (EN-DC) between the apparatus and the network.

In a twelfth aspect, a wireless communication device is disclosed. The wireless communication device includes: a communication interface configured for wireless communication with a network, comprising a plurality of antennas; a memory; and a processor operatively coupled to the communication interface and the memory. The processor and the memory are configured to: establish a first connection and concurrently a second connection with the network using the plurality of antennas shared by the first connection using a first radio access technology (RAT) and the second connection using a second RAT; configure a plurality of sounding reference signal (SRS) transmissions of the first connection based on a switching order of the plurality of antennas; and modify communication of the second connection or the plurality of SRS transmissions to mitigate disruption of the communication of the second connection due to the switching order of the plurality of antennas.

In a thirteenth aspect, the wireless communication device of the twelfth aspect is configured to perform any of the methods of the first to eleventh aspects.

In a fourteenth aspect, a user equipment (UE) for wireless communication is disclosed. The UE comprises: means for establishing a first connection and concurrently a second connection with a network using a plurality of antennas shared by the first connection using a first radio access technology (RAT) and the second connection using a second RAT; means for configuring a plurality of sounding reference signal (SRS) transmissions of the first connection based on a switching order of the plurality of antennas; and means for modifying communication of the second connection or the plurality of SRS transmissions to mitigate disruption of the communication of the second connection due to the switching order of the plurality of antennas.

In a fifteenth aspect, the UE of the fourteenth aspect is configured to perform any of the methods of the first to eleventh aspects.

In a sixteenth aspect, a computer-readable storage medium stored with code executable by a wireless communication device is disclosed. The code comprises instructions for: establishing a first connection and concurrently a second connection with a network using a plurality of antennas shared by the first connection using a first radio access technology (RAT) and the second connection using a second RAT; configuring a plurality of sounding reference signal (SRS) transmissions of the first connection based on a switching order of the plurality of antennas; and modifying communication of the second connection or the plurality of SRS transmissions to mitigate disruption of the communication of the second connection due to the switching order of the plurality of antennas.

In a seventeenth aspect, the code of the sixteenth aspect comprises instructions for performing any of the methods of the first to eleventh aspects.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-20 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication at an apparatus a user equipment (UE), comprising:
    establishing a first connection and concurrently a second connection with a network using a plurality of antennas shared by the first connection using a first radio access technology (RAT) and the second connection using a second RAT;
    configuring a plurality of sounding reference signal (SRS) transmissions of the first connection based on a switching order of the plurality of antennas; and
    modifying communication of the second connection or the plurality of SRS transmissions to mitigate disruption of the communication of the second connection due to the switching order of the plurality of antennas, wherein modifying the communication of the second connection or the plurality of SRS transmissions comprises at least one of:
        rescheduling, by the UE, a time for search, reception, or measurement of at least one of a primary synchronization signal (PSS), a secondary synchronization signal (SSS), a cell-specific reference signal (CRS), or a physical broadcast channel (PBCH) of the second connection to occur outside of a time interval associated with the plurality of SRS transmissions;
        blanking an uplink transmission of the second connection in the time interval overlapping the plurality of SRS transmissions of the first connection; or
        omitting the plurality of SRS transmissions in the time interval to avoid disrupting the communication of the second connection in the time interval.

2. The method of claim 1, wherein modifying the communication of the second connection or the plurality of SRS transmissions comprises: rescheduling search, reception, or measurement of at least one of the PSS, SSS, CRS, or PBCH of the second connection to occur outside of the time interval associated with the plurality of SRS transmissions.

3. The method of claim 1, wherein modifying the communication of the second connection or the plurality of SRS transmissions comprises:
    blanking the uplink transmission of the second connection in the time interval overlapping the plurality of SRS transmissions of the first connection.

4. The method of claim 1, further comprising:
    transmitting the plurality of SRS transmissions in sequence while switching a transmit antenna based on the switching order of the plurality of antennas.

5. The method of claim 4, further comprising:
    determining that the switching of the transmit antenna disrupts an ability of the UE to use at least one of the plurality of antennas for the communication of the second connection.

6. The method of claim 4, wherein transmitting the plurality of SRS transmissions comprises:
    disconnecting a first antenna of the plurality of antennas from a radio frequency (RF) chain of the second RAT during a time interval corresponding to the communication of the first connection; and
    connecting the first antenna to an RF chain of the first RAT during the time interval corresponding to the communication of the first connection.

7. The method of claim 1, wherein modifying the communication of the second connection or the plurality of SRS transmissions comprises:
    omitting the plurality of SRS transmissions in the time interval to avoid disrupting the communication of the second connection in the time interval.

8. The method of claim 7, wherein the communication of the second connection comprises receiving a positioning reference signal (PRS) from the network.

9. The method of claim 7, wherein the communication of the second connection comprises a handover operation of the second connection.

10. The method of claim 1,
    wherein the first connection comprises a New Radio (NR) connection between the UE and the network, and the second connection comprises a long term evolution (LTE) connection between the UE and the network, and
    wherein the LTE connection and the NR connection are configured to provide evolved universal terrestrial radio access network new radio dual-connectivity (EN-DC) between the UE and the network.

11. A wireless communication device comprising:
    a communication interface configured for wireless communication with a network, comprising a plurality of antennas;
    a memory; and
    a processor coupled to the communication interface and the memory,
    the processor being configured to cause the wireless communication device to:
    establish a first connection and concurrently a second connection with the network using the plurality of antennas shared by the first connection using a first radio access technology (RAT) and the second connection using a second RAT;

configure a plurality of sounding reference signal (SRS) transmissions of the first connection based on a switching order of the plurality of antennas; and modify communication of the second connection or the plurality of SRS transmissions to mitigate disruption of the communication of the second connection due to the switching order of the plurality of antennas, wherein the processor is configured to cause the wireless communication device to modify the communication of the second connection or the plurality of SRS transmissions by being configured to at least one of:

reschedule, by the wireless communication device, a time for search, reception, or measurement of at least one of a primary synchronization signal (PSS), a secondary synchronization signal (SSS), a cell-specific reference signal (CRS), or a physical broadcast channel (PBCH) of the second connection to occur outside of a time interval associated with the plurality of SRS transmissions;

blank an uplink transmission of the second connection in the time interval overlapping the plurality of SRS transmissions of the first connection; or omit the plurality of SRS transmissions in the time interval to avoid disrupting the communication of the second connection in the time interval.

12. The wireless communication device of claim 11, wherein the processor is configured to cause the wireless communication device to modify the communication of the second connection or the plurality of SRS transmissions by being configured to cause the wireless communication device to:

reschedule search, reception, or measurement of at least one of the PSS, SSS, CRS, or PBCH of the second connection to occur outside of the time interval associated with the plurality of SRS transmissions.

13. The wireless communication device of claim 11, wherein the processor is configured to cause the wireless communication device to modify the communication of the second connection or the plurality of SRS transmissions by being configured to cause the wireless communication device to:

blank the uplink transmission of the second connection in the time interval overlapping the plurality of SRS transmissions of the first connection.

14. The wireless communication device of claim 11, wherein the processor is further configured to cause the wireless communication device to:

transmit the plurality of SRS transmissions in sequence while switching a transmit antenna based on the switching order of the plurality of antennas.

15. The wireless communication device of claim 14, wherein the processor is further configured to cause the wireless communication device to:

determine that the switching of the transmit antenna disrupts an ability of the wireless communication device to use at least one of the plurality of antennas for the communication of the second connection.

16. The wireless communication device of claim 14, wherein the processor is further configured to transmit the plurality of SRS transmissions by being configured to cause the wireless communication device to:

disconnect a first antenna of the plurality of antennas from a radio frequency (RF) chain of the second RAT during a time interval corresponding to the communication of the first connection; and connect the first antenna to an RF chain of the first RAT during the time interval corresponding to the communication of the first connection.

17. The wireless communication device of claim 11, wherein the processor is further configured to modify the communication of the second connection or the plurality of SRS transmissions by being configured to cause the wireless communication device to:

omit the plurality of SRS transmissions in the time interval to avoid disrupting the communication of the second connection in the time interval.

18. The wireless communication device of claim 17, wherein the communication of the second connection comprises receipt of a positioning reference signal (PRS) from the network.

19. The wireless communication device of claim 17, wherein the communication of the second connection comprises a handover operation of the second connection.

20. The wireless communication device of claim 11, wherein the first connection comprises a New Radio (NR) connection between the wireless communication device and the network, and the second connection comprises a long term evolution (LTE) connection between the wireless communication device and the network, and wherein the LTE connection and the NR connection are configured to provide evolved universal terrestrial radio access network new radio dual-connectivity (EN-DC) between the wireless communication device and the network.

21. A user equipment (UE) for wireless communication, comprising:

means for establishing a first connection and concurrently a second connection with a network using a plurality of antennas shared by the first connection using a first radio access technology (RAT) and the second connection using a second RAT;

means for configuring a plurality of sounding reference signal (SRS) transmissions of the first connection based on a switching order of the plurality of antennas; and means for modifying communication of the second connection or the plurality of SRS transmissions to mitigate disruption of the communication of the second connection due to the switching order of the plurality of antennas, wherein the means for modifying the communication of the second connection or the plurality of SRS transmissions comprises at least one of:

means for rescheduling, by the UE, a time for search, reception, or measurement of at least one of a primary synchronization signal (PSS), a secondary synchronization signal (SSS), a cell-specific reference signal (CRS), or a physical broadcast channel (PBCH) of the second connection to occur outside of a time interval associated with the plurality of SRS transmissions;

means for blanking an uplink transmission of the second connection in the time interval overlapping the plurality of SRS transmissions of the first connection; or means for omitting the plurality of SRS transmissions in the time interval to avoid disrupting the communication of the second connection in the time interval.

* * * * *